United States Patent [19]

Surprenant

[11] Patent Number: 4,525,400
[45] Date of Patent: Jun. 25, 1985

[54] COMPOSITION FOR PROMOTING ADHESION OF CURABLE SILICONES TO SUBSTRATES

[75] Inventor: Richard P. Surprenant, Troy, N.Y.

[73] Assignee: General Electric Company, Waterford, N.Y.

[21] Appl. No.: 609,141

[22] Filed: May 25, 1984

Related U.S. Application Data

[62] Division of Ser. No. 424,268, Sep. 27, 1982, Pat. No. 4,461,867.

[51] Int. Cl.³ ............................................. B32B 3/00
[52] U.S. Cl. ...................................... 428/54; 428/58; 428/447; 156/329; 556/434
[58] Field of Search .......................... 428/54, 58, 447; 156/329; 556/434

[56] References Cited

U.S. PATENT DOCUMENTS

| | | | |
|---|---|---|---|
| 2,938,009 | 5/1960 | Lucas | 260/37 |
| 3,004,859 | 10/1961 | Lichtenwalner | 106/308 |
| 3,035,016 | 5/1962 | Bruner | 260/46.5 |
| 3,065,194 | 11/1962 | Nietzche et al. | 260/46.5 |
| 3,122,522 | 2/1964 | Brown et al. | 260/46.5 |
| 3,133,891 | 5/1964 | Ceyzeriat | 260/18 |
| 3,161,614 | 12/1964 | Brown et al. | 260/46.5 |
| 3,170,894 | 2/1965 | Brown et al. | 260/46.5 |
| 3,175,993 | 3/1965 | Weyenberg | 260/46.5 |
| 3,220,972 | 11/1965 | Lamoreaux | 260/46.5 |
| 3,294,739 | 12/1966 | Weyenberg | 260/46.5 |
| 3,296,161 | 1/1967 | Kulpa | 260/18 |
| 3,334,067 | 8/1967 | Weyenberg | 260/46.5 |
| 3,382,205 | 5/1968 | Beers | 260/37 |
| 3,383,355 | 5/1968 | Cooper | 260/46.5 |
| 3,438,930 | 4/1969 | Beers | 260/37 |
| 3,499,859 | 3/1970 | Matherly | 260/37 |
| 3,517,001 | 6/1970 | Berger | 260/37 |
| 3,542,901 | 11/1970 | Cooper et al. | 260/825 |
| 3,635,743 | 1/1972 | Smith | 106/288 Q |
| 3,700,714 | 10/1972 | Hamilton et al. | 260/448.2 B |
| 3,708,467 | 1/1973 | Smith et al. | 260/185 |
| 3,719,635 | 3/1973 | Clark et al. | 260/46.5 G |
| 3,775,452 | 11/1973 | Karstedt | 260/429 R |
| 3,779,986 | 12/1973 | Smith et al. | 260/46.5 G |
| 4,036,813 | 7/1977 | Hardman et al. | 260/46.5 G |
| 4,100,129 | 7/1978 | Beers | 260/37 SB |
| 4,180,642 | 12/1979 | Takago | 528/32 |
| 4,248,993 | 2/1981 | Takago | 528/38 |
| 4,257,932 | 3/1981 | Beers | 260/18 S |

Primary Examiner—Melvyn I. Marquis

[57] ABSTRACT

The adhesion of self-bonding, low modulus, one package, room temperature vulcanizable silicone compositions to a variety of substrates is effectively promoted by incorporating in the silicone composition, before curing, a small effective amount of an adhesion promoting composition comprising predominantly at least one diorganocyclopolysiloxane compound of the formula:

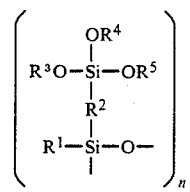

wherein $R^1$ may be $C_1$–$C_6$ alkyl, $C_1$–$C_6$ gamma-trihaloalkyl or phenyl; $R^2$ is alkylene of from 2 to 6 carbon atoms; $R^3$, $R^4$ and $R^5$ are, independently, $C_1$–$C_6$ alkyl or $C_2$–$C_6$ alkanoyl; and n is either 3 or 4.

12 Claims, No Drawings

COMPOSITION FOR PROMOTING ADHESION OF CURABLE SILICONES TO SUBSTRATES

This is a divisional of U.S. application Ser. No. 424,268 filed Sept. 27, 1982, now U.S. Pat. No. 4,461,867.

BACKGROUND OF THE INVENTION

The present invention relates to compositions for enhancing the bonding of silicones to substrates. More particularly, it relates to self-bonding, one package, room temperature vulcanizable, silicone compositions curable in the presence of moisture which contain a small, effective, adhesion promoting amount of a composition comprising a diorganocyclopolysiloxane.

Room temperature vulcanizing silicone compositions are presently widely known. For example, Nietzche and Wick in U.S. Pat. No. 3,065,194, disclose a family of silicone rubber compositions comprising an essentially anhydrous mixture of (1) a linear organosiloxane polymer having hydroxyl terminal groups, (2) a polyfunctional organosilicone crosslinking agent, and (3) a metal salt, chelate, organometallic compound, acid or base, which serves as a crosslinking catalyst. These compositions vulcanize or cure to rubbery solids when exposed to moisture. The compositions are extremely useful because they can be maintained for extended periods of time in a single container ready for use, e.g., sealed in caulking tubes. The user may then apply the material to a substrate and simply bring it into contact with water or water vapor to cure it. The compositions are useful as sealants, electrical insulation, coatings, dental cement, caulking compounds, expansion joints, gaskets, shock absorbers, adhesives and in many other applications.

Other one package room temperature vulcanizing silicone compositions are described in Bruner, U.S. Pat. No. 3,035,016 and Ceyzeriat, U.S. Pat. No. 3,133,891, which deal with one package compositions comprising the reaction products of acyloxy-substituted silanes and hydroxylated siloxanes. The compositions cure with the liberation of acid fragments and curing may be promoted with various agents, such as organic derivatives of tin. Also of interest is U.S. Pat. No. 3,164,614, to Brown et al., which discloses compositions of a pretreated silanol end-stopped diorganopolysiloxane and crosslinker in combination with a crosslinking catalyst. Copper, in U.S. Pat. No. 3,383,355, describes the preparation of an alkoxy-terminated linear siloxane polymer using a neutral, finely-divided solid catalyst, such as fuller's earth. A moisture curable RTV composition which includes a hydrocarbonoxy end-blocked diorganopolysiloxane and a metal-containing curing catalyst together with boron nitride is described in U.S. Pat. No. 3,499,859.

Still another composition is described by Cooper et al. in U.S. Pat. No. 3,542,901 which comprises a mixture of a linear siloxane having di- or tri-functional end-blocking units with a linear siloxane having chemically non-functional inert end-blocking units on one end and di- or tri-functional end-blocking units on the other end, and further including a catalyst and crosslinker. Additionally of interest are: Brown et al., U.S. Pat. No. 3,122,522, who combine organopolysiloxane intermediates containing condensable "cellosolvoxy" groups with a catalyst; Brown et al., U.S. Pat. No. 3,170,894, who combine organopolysiloxane intermediates containing condensable polyhydrocarbonoxy type radicals with a catalyst; and Weyenberg, U.S. Pat. No. 3,175,993, who combines organopolysiloxane intermediates end-blocked with alkoxylated silcarbonate groups with a catalyst.

Still other moisture curable one package RTV silicone compositions are disclosed in U.S. Pat. Nos. 3,689,454; 3,779,986; 3,294,739; 3,334,067; and 3,719,635.

Two other compositions of particular interest are disclosed by Beers in U.S. Pat. Nos. 4,100,129 and 4,257,932, respectively, each patent being assigned to the same assignee as the present invention. In U.S. Pat. No. 4,100,129 compositions are disclosed comprising: 100 parts by weight of a silanol chain-stopped polydiorganosiloxane; from 0.01 to 5.0 parts by weight of a cross-linking silane of the formula:

wherein R' and R" are each, independently, organic radicals of up to 8 carbon atoms selected from hydrocarbyl, halohydrocarbyl and cyano lower alkyl and n has a value of 0 to 3 and an average value based on the total amount of silane in the composition of 0 to 1.99; and from 0.10 to 10 parts by weight of a silanol reactive organometallic ester compound, wherein the weight of the organometallic ester compound to the cross-linking silane is always greater than 0.5 and preferably greater than 1.0. If compositions are prepared from the above-described ingredients in the specified ratios, a self-bonding, low modulus room temperature vulcanizing silicone composition is obtained which exhibits a very advantageous tensile and elongation relationship, i.e., low tensile and exceptionally high elongation, and in addition exhibits good adhesion to troublesome substrates.

In U.S. Pat. No. 4,257,932, an especially useful gasketing composition is disclosed which displays resistance to hot hydrocarbon oils and improved adhesion to substrates at elevated temperatures. This composition comprises a silanol chain-stopped polydiorganosiloxane, a fluid polysiloxane containing a high degree of tri- or tetrafunctionality or both, a finely divided silica filler, a polysilane crosslinker, and a crosslinking catalyst comprising an organic tin salt of an organic acid or a tin salt of an organic acid, with each ingredient being present in carefully specified amounts, and optionally containing a finely divided iron oxide thermal stabilizer.

Still another useful one package, room temperature vulcanizable silicone composition is described in copending application, Ser. No. 277,524, filed June 26, 1981 of White et al., (now U.S. Pat. No. 4,395,526), assigned to the same assignee as the present invention. As described therein, especially stable room temperature vulcanizable organopolysiloxane compositions comprise:

(a) an organopolysiloxane wherein the silicon atom at each polymer chain end is terminated with at least two alkoxy radicals;
(b) an effective amount of a condensation catalyst;
(c) a stabilizing amount of a silane scavenger having the formula:

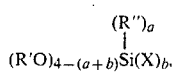

wherein R' is a C$_1$–C$_8$ aliphatic organic radical selected from the group consisting of alkyl, alkylether, alkylester, alkylketone, and alkylcyano radicals, or a C$_7$–C$_{13}$ aralkyl radical; R'' is a C$_1$–C$_{13}$ monovalent substituted or unsubstituted hydrocarbon radical; X is a hydrolyzable leaving group selected from the group consisting of amido, amino, carbamato, enoxy, imidato, isocyanato, oximato, thioisocyanato and ureido radicals, and, a is an integer equal to 0 to 3 inclusive; where X is enoxy or amido, (d) an effective amount of a curing accelerator selected from the group consisting of substituted guanidines, amines and mixtures thereof; and (e) a cross-linking polyalkoxysilane of the formula:

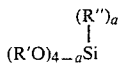

wherein R', R'' and a are the same as R' and R'' defined above.

These useful polyalkoxy-terminated organopolysiloxane RTV compositions may also be prepared from compositions containing as a starting material a silanol chain-stopped diorganopolysiloxane together with a larger amount of the silane scavenger described as component (c) above, such that the silane scavenger acts both as a scavenger for hydroxy functional groups and a polyalkoxysilane cross-linking agent for terminating the silicon atom at each organopolysiloxane chain with at least two alkoxy radicals.

These compositions are described as stable, which means that each forms a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

Although many of the prior art moisture-curable, one package room temperature vulcanizing compositions have been very useful in different applications, there is still room for improvement. For example, the benefits provided by these compositions and the areas of application could be extended if the adhesion of the compositions to various substrates at room temperature and other temperatures could be improved.

In the past, attempts to improve the adhesion of RTV silicone compositions to hard-to-bond substrates, such as metallic and thermoplastic surfaces, have generally fallen into three categories, i.e., treating the substrate with a primer material; using an adhesive composition to bond the silicone composition to the substrate; and lastly, incorporating adhesion-promoting additives in the RTV silicone composition itself. Of these three techniques, only the incorporation of additives provides a single step, single package product which is clearly the most demanded, useful and versatile.

In the prior art several different compounds have been added to RTV silicone compositions to improve their adhesion to substrates. For example, Kulpa, in U.S. Pat. No. 3,296,161 discloses that the addition of a dialkoxydiacyloxysilane having the formula (RO)$_2$Si(OY)$_2$ wherein R is a lower alkyl radical and Y is a saturated aliphatic monoacyl radical of a carboxylic acid, to an RTV silicone composition comprising (a) a liquid organopolysiloxane containing from 0.02 to 2.0% by weight silicone bonded hydroxyl groups; (b) an organotriacyloxysilane, and (c) a carboxylic acid metal salt as a cure accelerator provides a product which exhibits improved adhesion to stainless steel and aluminum, as well as to surfaces such as glass and acrylic resins. In U.S. Pat. No. 3,438,930 to Beers it is disclosed that improved adhesion may result if a proper crosslinking silane is selected. More particularly, compositions comprising the reaction product of (a) a hydrolyzable silane of the formula:

wherein Y is a hydrolyzable radical and R is selected from monovalent hydrocarbon radicals, halogenated monovalent hydrocarbon radicals, and R'$_3$CO radicals and R' is an alkyl radical and (b) an organopolysiloxane polymer terminated with a mixture of silanol radicals and tert-alkoxy radicals are described as exhibiting superior toughness and adhesion to a variety of unprimed substrates. Additionally, Hamilton et al. in U.S. Pat. No. 3,700,714, disclose that a acetodialkenyl substituted silanes are useful adhesion promoting crosslinking agents for silanol chain-stopped diorganopolysiloxanes. More particularly, Hamilton et al. disclose that silanes having one or more tert-alkoxy groups as silicone substituents, for example di-t-butoxy-diacetoxysilane, are effective adhesion promoters especially when bonding RTV compositions to substrates which are normally covered with an oxide film, such as aluminum.

Another useful family of adhesion promoting additives for room temperature vulcanizable silicone compositions is described by Berger in U.S. Pat. No. 3,517,001. The members of this family comprise the silicon-substituted isocyanuarates, known as mono-, di- and trisilylisocyanurates, of the formula:

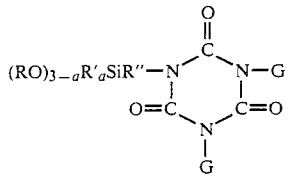

where R is an alkyl radical having from 1 to 8 carbon atoms, R' is a member selected from monovalent saturated hydrocarbon radicals, R'' is selected from divalent saturated hydrocarbon radicals and halogenated divalent saturated hydrocarbon radicals, G is selected from R' radicals, (RO)$_3-a$—R'$_a$ Si R'' radicals, aliphatically unsaturated monovalent hydrocarbon radicals, and halogenated hydrocarbon radicals and a is a whole number equal to 0 to 3, inclusive. Examples of preferred adhesion promoters from the above-described compounds are 1,3,5-tristrimethyoxysilylpropylisocyanurate and bis-trimethoxysilylpropylisocyanurate.

Still another adhesion promoting additive useful in those applications where the RTV composition is to be bonded to a metal substrate is described in U.S. Pat. No. 3,719,635 to Clark et al. As disclosed therein, adhesion is promoted by the addition of from 0.01 to 2 parts by weight of a metal in the form of a metal hydrocarbonoxide selected from the group consisting of Fe(OR')$_3$, V(OR")₃, Co(OR")₂, MoO₂(OR")₂; Zn(OR")₂; Ce(OR")₃ and Al(OCH₂CH₃)₃ wherein R' is selected from ethyl, normal propyl, normal butyl, and phenyl and R" is selected from ethyl, normal propyl and normal butyl.

Perhaps the most effective and widely used adhesion promoting additives, aside from the silylisocyanuarates disclosed by Berger above, are the carbamates and allophanates used and prepared in accordance with the teachings of Hardman et al., U.S. Pat. No. 4,306,813. As described therein useful adhesion promoters are provided in the form of a compound of the formula:

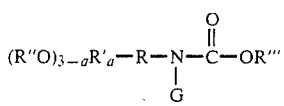

wherein G is hydrogen or a group of the formula:

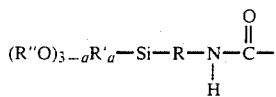

and R is divalent radical selected from alkylenearylene, alkylene, cycloalkylene of up to 8 carbon atoms, R' and R''', independently, are radicals of up to 8 carbon atoms selected from hydrocarbyl or halohydrocarbyl, R" is a radical of up to 8 carbon atoms selected from hydrocarbyl, halohydrocarbyl or cyanohydrocarbyl and a is 0 to 3, or mixtures of such compounds. Although, these adhesion promoting additives have proved to be effective, they are very expensive to use. The need for a low cost, adhesion promoting additive for low modulus curable silicone compositions still exists.

Finally, mention should be made of glycidoxypropyltrimethoxysilane, which Beers discloses to be still another useful adhesion promoting additive for RTV silicone compositions in U.S. Pat. No. 4,257,932. Each of the above-cited patents and applications are specifically incorporated herein by reference.

It has presently been discovered that the adhesion of moisture curable one-package, low modulus, room temperature vulcanizable silicone compositions to various substrates is effectively improved by the addition of an adhesion promoter composition comprising at least one diorganocyclopolysiloxane. The adhesion promoters of the subject invention may be prepared and used at lower cost than the prior art isocyanurate adhesion promoters and their carbamate and allophanate derivatives, and generally provide at least as good adhesion to a variety of substrates.

SUMMARY OF THE INVENTION

In accordance with these and many other objects, the present invention provides new and improved adhesion promoting compositions effective at promoting the adhesion of self-bonding, low modulus, one package, moisture curable room temperature vulcanizing silicone compositions to various substrates. The new and improved adhesion promoter composition comprises a diorganocyclopolysiloxane compound of the formula:

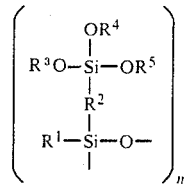

wherein $R^1$ may be $C_1$-$C_6$ alkyl, $C_1$-$C_6$ gamma-trihaloalkyl or phenyl; $R^2$ is divalent alkylene of from 2 to 6 carbon atoms; and $R^3$, $R^4$ and $R^5$ are, independently, $C_1$-$C_6$ alkyl or $C_2$-$C_6$ alkanoyl and n is either 3 or 4. In addition, the present invention also provides a process for the preparation of the diorganocyclopolysiloxane adhesion promoters.

The diorganocyclopolysiloxane compounds of the subject invention are useful to promote the adhesion of room temperature vulcanizable silicone compositions to various substrates. In accordance with this aspect of the invention new and improved curable silicone compositions exhibiting superior adhesion to substrates are provided, said silicone compositions comprising:

(a) a silanol or polyalkoxy chain-stopped polydiorganosiloxane;
(b) a silane or polysilane crosslinker therefor;
(c) a catalyst capable of promoting the reactions between (a) and (b); and
(d) a small, effective, adhesion promoting amount of a diorganocyclopolysiloxane adhesion promoter of the subject invention as defined above.

The new and improved adhesion promoting compounds of the subject invention generally may be incorporated into any room temperature vulcanizable silicone composition. The above formulation is offered as a representative of such compositions and will be employed in the description of the invention for illustrative purposes only and should not be construed as a limitation.

The adhesion promoting compounds of this invention are generally added in small effective amounts of from 0.1 to about 15% by weight based upon the weight of the diorganopolysiloxane base polymer, and amounts of from 0.2% to about 2.0% by weight of the overall composition are generally preferred.

The preferred adhesion promoting compounds of the subject invention are 1,3,5-tri-methyl-1,3,5,tris-2-trimethoxysilyl ethylcyclotrisiloxane and 1,3,5,7-tetra-methyl-1,3,5,7-tetrakis-2-trimethoxysilylethylcyclotetrasiloxane.

The new and improved adhesion promoter compounds of the subject invention may be prepared by reacting a methylhydrogencyclopolysiloxane trimer or tetramer dissolved in a suitable aromatic solvent, such as toluene, and heated to reflux, with a vinyl or vinylalkyl trialkoxy or triacyloxysilane, allowing the addition reaction to proceed at reflux until substantially complete and thereafter removing the solvent to leave the adhesion promoter product.

One preferred embodiment of a new and improved one package room temperature vulcanizable silicone composition curable in the presence of moisture to a self-bonding, low modulus, elastic solid which exhibits superior adhesion to substrates within the scope of the present invention is provided by a composition comprising:

(a) 100 parts by weight of a silanol chain-stopped polydiorganosiloxane of the formula:

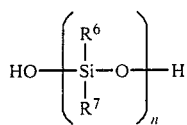

wherein $R^6$ and $R^7$ are each, independently, organic radicals of up to 8 carbon atoms selected from hydrocarbyl, halohydrocarbyl and cyano lower alkyl and n is an average number of from about 10 to 15,000;

(b) from 0.01 to 5.0, preferably, 0.1 to 0.95 parts by weight of a cross-linking silane of the formula:

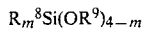

wherein $R^8$ and $R^9$ are the same as defined for $R^6$ and $R^7$ hereinabove and m has a value of 0 to 3 and an average value based on the total amount of silane in the composition of 0 to 1.99;

(c) from 0.1 to 10 parts by weight of a silanol reactive organometallic ester compound of a metal, the compound having radicals attached to the metal atom, at least one of said radicals being a hydrocarbonoxy radical or a substituted hydrocarbonoxy radical, said radicals being attached to the metal atoms through M—O—R linkages wherein M is the metal and any remaining valences of the metal are satisfied by substituents selected from organic radicals which are attached to the atom through M—O—C linkages, —OH and —O— of a M—O—M linkage, the weight ratio of component (c) to (b) always being greater than 0.5 to 1, and preferably greater than unity;

(d) from about 10 to 250 parts by weight of a filler per 100 parts of component (a) selected from the group consisting of calcium carbonate, fumed silica, and mixtures of the two; and (e) from about 0.2 to 2 parts by weight of an adhesion promoter composition per 100 parts of component (a), said adhesion promoting composition comprising at least one compound of the formula:

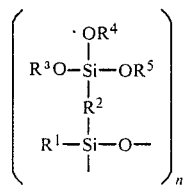

wherein $R^1$ may be $C_1$-$C_6$ alkyl, $C_1$-$C_6$ gamma-trihaloalkyl or phenyl; $R^2$ is alkylene of from 2 to 6 carbon atoms; and $R^3$, $R^4$ and $R^5$ are, independently, $C_1$-$C_6$ alkyl or $C_2$-$C_6$ alkanoyl and n is either 3 or 4.

Another preferred embodiment of a new and improved room temperature vulcanizable silicone composition within the scope of the present invention is a self-bonding low modulus, one package RTV composition curable in the presence of moisture to form a highly thermally stable elastic solid resistant to hot hydrocarbon oils and exhibiting superior adhesion to substrates which comprises:

(a) 100 parts by weight of a silanol chain-stopped polydiorganosiloxane of the formula:

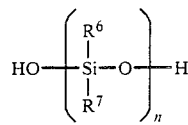

wherein $R^6$ and $R^7$ are each, independently, organic radicals of up to 8 carbon atoms selected from hydrocarbyl, halohydrocarbyl and cyano lower alkyl and n is an average number of from 10 to 15,000;

(b) from 2 to 20 parts by weight of a fluid polysiloxane containing a high degree of trifunctionality, tetrafunctionality or a mixture of tri- and tetrafunctionality and comprising:
  (i) from 25 to 60 mole percent of monoalkylsiloxy units;
  (ii) from 1 to 6 mole percent of trialkylsiloxy units; and
  (iii) from 34 to 74 mole percent of dialkylsiloxy units; said polysiloxane containing from about 0.1 to about 2% by weight of silicon-bonded hydroxyl groups;

(c) from 10 to 100 parts by weight of a finely divided silica filler;

(d) from 3 to 10 parts by weight of a cross-linking silane of the formula:

wherein $R^{10}$ is defined the same as $R^6$ and $R^7$ above, and $R^{11}$ is an organic radical of 6 to 30 carbon atoms selected from hydrocarboyl and halohydrocarboyl and m has a value of 0 to 1;

(e) from 0.01 to 10 parts by weight of a curing catalyst selected from the group consisting of an organic tin salt of an organic acid, and a tin salt of an organic acid, said organic acid containing from 2 to 6 carbon atoms; and (f) from about 0.2 to 2 parts by weight of an adhesion promoter composition per 100 parts of component (a), said adhesion promoter composition comprising at least one compound of the formula:

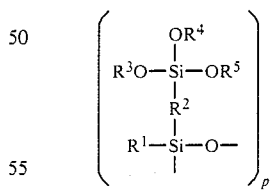

wherein $R^1$ may be $C_1$-$C_6$ alkyl, $C_1$-$C_6$ gamma-trihaloalkyl or phenyl; $R^2$ is divalent alkylene of from 2 to 6 carbon atoms; and $R^3$, $R^4$ and $R^5$ are, independently, $C_1$-$C_6$ alkyl or $C_2$-$C_6$ alkanoyl and p is either 3 or 4.

Still another preferred embodiment of a new and improved room temperature vulcanizable silicone composition within the scope of the present invention is a self-bonding, low modulus, one package RTV composition curable in the presence of moisture to form an elastic solid exhibiting superior adhesion to substrates and improved storage stability, said composition comprising:
(a) 100 parts by weight of a polyalkoxyterminated organopolysiloxane of the formula:

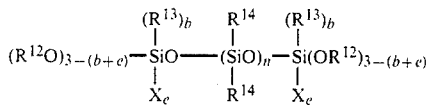

wherein $R^{14}$ is a $C_{(1-13)}$ monovalent substituted or unsubstituted hydrocarbon radical, $R^{12}$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^{13}$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals and, b is a whole number equal to 0 or 1, e is a whole number equal to 0 or 1 inclusive and the sum of b+e is equal to 0 or 1 inclusive, and n is an integer having a value of from about 50 to about 2500 inclusive.
(b) from about 0 to 10 parts by weight of a crosslinking silane of the formula:

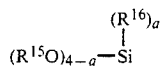

wherein $R^{15}$ is a $C_{(1-8)}$ aliphatic organic radical selected from alkyl, alkylether, alkylester, alkylketone, alkylcyano or a $C_{(7-13)}$ aralkyl radical, $R^{16}$ is a $C_{(1-13)}$ monovalent substituted or unsubstituted hydrocarbon radical and a is an integer equal to 0 or 1;
(c) an effective amount of a condensation catalyst selected from the group consisting of tin compounds, zirconium compounds, titanium compounds, and mixtures thereof;
(d) a stabilizing amount of a scavenging silane of the formula:

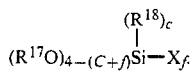

wherein $R^{17}$ and $R^{18}$ are the same as $R^{15}$ and $R^{16}$ as defined in (b) above, X is a hydrolyzable leaving group selected from amido, amino, carbamato, enoxy, imidato, isocyanato, oximato, thioisocyanato, and ureido radicals, c is an integer equal to 0 to 3 inclusive, f is an integer equal to 1 to 4 inclusive, and the sum of c+f is equal to 1 to 4 inclusive; and
(e) a minor effective adhesion promoting amount of an adhesion promoter composition comprising at least one compound of the formula:

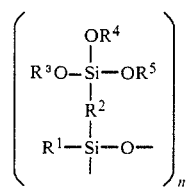

wherein $R^1$ may be $C_1$-$C_6$ alkyl, $C_1$-$C_6$ gamma-trihaloalkyl or phenyl; $R^2$ is alkylene of from 2 to 6 carbon atoms; $R^3$, $R^4$, and $R^5$ are independently, $C_1$-$C_6$ alkyl or $C_2$-$C_6$ alkanoyl and n is either 3 or 4.

According to a further aspect of this invention, there is provided a method of preparing a rubbery adhesive which comprises preparing a curable silicone composition as in any one of the above-described embodiments under substantially anhydrous conditions, and thereafter exposing the composition to moisture until it cures to a rubbery material. In accordance with still further aspects of the present invention there are provided articles of manufacture comprising a plurality of workpieces having at least a part of a surface portion in close proximity to another and having an adhesive joint therebetween being formed of a composition as defined above, as well as a method for bonding articles to produce such articles of manufacture.

The new and improved adhesion promoters and new and improved RTV silicone compositions incorporating same are cheaper to produce and use than prior art compositions and exhibit very satisfactory adhesion to substrates of wood, glass, masonry, ceramics, metals and plastics.

Other objects and advantages of the subject invention will become apparent from the following detailed description and examples.

DETAILED DESCRIPTION OF THE INVENTION

The new and improved adhesion promoters of the subject invention are the diorganocyclopolysiloxanes, generally represented by the formula:

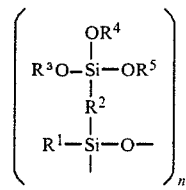

wherein $R^1$ may be $C_1$-$C_6$ alkyl, $C_1$-$C_6$ gamma-trihaloalkyl or phenyl; $R^2$ is alkylene of from 2 to 6 carbon atoms; $R^3$, $R^4$, and $R^5$ are, independently, $C_1$-$C_6$ alkyl or $C_2$-$C_6$ alkanoyl; and n is either 3 or 4. Especially preferred adhesion promoters within the above formula are:
1,3,5-trimethyl-1,3,5-trimethoxysilylethylcyclotrisiloxane, e.g.,

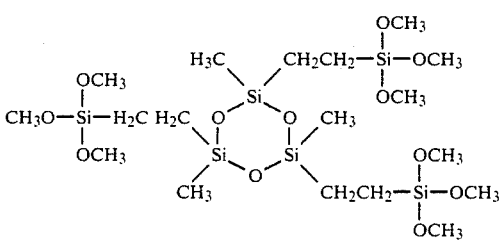

and 1,3,5,7-tetramethyl-1,3,5,7-tetrakis-trimethoxysilylethylcyclotetrasiloxane, e.g.,

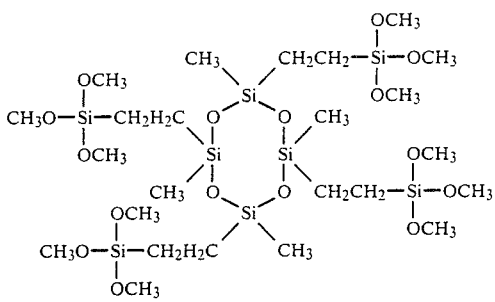

The diorganocyclopolysiloxane adhesion promoter compounds of the subject invention may be prepared by first dissolving a methylhydrogencyclo- tri- or tetrasiloxane in an aromatic organic solvent, such as toluene, to form approximately a 20% solution. The solution is heated to reflux and a minor catalytic amount, for example three drops, of a platinum complex catalyst is added. Suitable platinum complex catalysts are those prepared and described in U.S. Pat. No. 3,220,972 to Lamoreaux and in U.S. Pat. No. 3,775,452 to Karstedt respectively. Each of the above-identified patents are assigned to the same assignee as the present invention and each patent is specifically incorporated herein by reference. Thereafter a stoichiometric amount of the corresponding vinyl or vinylalkyltrialkoxy or triacyloxysilane is added and the ensuing exothermic addition reaction is allowed to proceed with the rate of addition of silane being controlled by the rate of reflux. The solution is then refluxed for a period of about two hours after all of the silane has been added. The aromatic solvent is then stripped from the solution by, for example, heating under a vacuum, and the diorganocyclotri- or tetrasiloxane adhesion promoter compound is obtained.

The diorganocyclopolysiloxanes prepared in accordance with the subject invention are particularly useful for promoting the adhesion of curable silicone compositions to a variety of substrates.

In accordance with this aspect of the present invention, new and improved self-bonding, low modulus, one package, room temperature vulcanizable silicone compositions are provided which are curable in the presence of moisture and exhibit superior adhesion to substrates. The compositions generally comprise:

(a) a silanol or polyalkoxy chain-stopped polydiorganosiloxane;
(b) a silane or polysilane crosslinker therefor;
(c) a catalyst capable of promoting the reactions between (a) and (b); and
(d) a small, effective, adhesion promoting amount of a diorganocyclopolysiloxane compound of the formula:

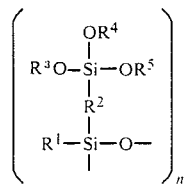

wherein $R^1$ is $C_1$–$C_6$ alkyl, $C_1$–$C_6$ gamma-trihaloalkyl or phenyl; $R^2$ is divalent alkylene of from 2 to 6 carbon atoms; $R^3$, $R^4$ and $R^5$ are, independently, $C_1$–$C_6$ alkyl or $C_2$–$C_6$ alkanoyl; and n is either 3 or 4.

The silanol chain-stopped polydiorganosiloxanes for use in this aspect of the invention may be represented by the formula:

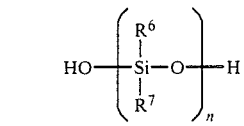

wherein $R^6$ and $R^7$ are each organic radicals of up to 20, and preferably up to 8 carbon atoms, selected from hydrocarbyl, halohydrocarbyl and cyano lower alkyl and n is a number that varies generally from about 10 to 15,000, preferably from 100 to 3,000, and more preferably from 300 to 1,500.

The silanol chain-stopped polydiorganosiloxanes are well-known in the art, for example they may be prepared as described in Beers, U.S. Pat. No. 3,382,205, and include compositions containing different $R^6$ and $R^7$ groups. For example, the $R^6$ groups can be methyl, while the $R^7$ groups can be phenyl and/or beta-cyanoethyl. Furthermore, within the scope of the definition of polydiorganosiloxanes useful in this invention are copolymers of various types of diorganosiloxane units, such as silanol chain-stopped copolymers of dimethylsiloxane units, diphenylsiloxane units, and methylphenylsiloxane units, or, for example, copolymers of dimethylsiloxane units, methylphenylsiloxane units and methylvinyl siloxane units. Preferably, at least 50% of the $R^6$ and $R^7$ groups of the silanol chain-stopped polydiorganosiloxanes are alkyl, e.g., methyl groups.

In the above formula, $R^6$ and $R^7$ can be, for example, mononuclear aryl, such as phenyl, benzyl, tolyl, xylyl and ethylphenyl; halogen-substituted mononuclear aryl, such as 2,6-dichlorophenyl, 4-bromophenyl, 2,5-difluorophenyl, 2,4,6-trichlorophenyl and 2,5-dibromophenyl; alkyl such as methyl, ethyl, n-propyl, isopropyl, n-butyl, sec-butyl, isobutyl, tertbutyl, amyl, hexyl, heptyl, octyl; alkenyl such as vinyl, allyl, n-butenyl-1, n-butenyl-2, n-pentenyl-2, n-hexenyl-2, 2,3-dimethylbutenyl-2, n-heptenyl; alkynyl such as propargyl, 2-butynyl; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, 1,4-dichlorohexyl, 3,3-dibromohexyl, bromooctyl; haloalkenyl such as chlorovinyl, bromovinyl, chloroallyl, bromoallyl, 3-chloro-n-butenyl-1, 3-chloro-n-pentyl-1, 3-fluoro-n-heptenyl-1, 1,3,3-trichloro-n-heptenyl-5, 1,3,5-trichloro-n-octenyl-6, 2,3,3-tri-chloromethylpentenyl-4; haloalkynyl such as chloropropargyl bromopropargyl; cycloalkyl; cycloalkenyl and alkyl and halogen substituted cycloalkyl and cycloalkenyl such as cyclopentyl, cyclohexyl, cycloheptyl, cyclooctyl, 6-methylcyclohexyl, 3,3-dichlorocyclohexyl, 2,6-dibromocycloheptyl, 1-cyclopentenyl, 3-methyl-1-cyclopentenyl, 3,4-dimethyl-1-cyclopentenyl, 5-methyl-5-cyclopentenyl, 3,4-dichloro-5-cyclopentenyl, 5-(tetbutyl)1-cyclopentenyl, 1-cyclohexenyl, 3-methyl-1-cyclohexenyl, 3,4-dimethyl-1-cyclohexenyl; and cyano lower alkyl such as cyanomethyl, beta-cyanoethyl, gamma-cyanopropyl, deltacyanobutyl, and gamma-cyanoisobutyl.

A mixture of various silanol chain-stopped polydiorganosiloxanes also may be employed. The silanol chain-stopped materials useful in the RTV compositions of this invention have been described as polydiorganosiloxanes but such materials can also contain minor amounts, e.g., up to about 20% of monoorganosiloxane units such as monosiloxane units, e.g., monomethylsiloxane units and monophenylsiloxane units. See, for example, Beers, U.S. Pat. Nos. 3,382,205 and 3,438,930, which are incorporated herein by reference.

The silanol chain-stopped polydiorganosiloxanes employed in the practice of the present invention may vary from low viscosity thin fluids to viscous gums, depending on the value of n and the nature of the particular organic groups represented by $R^6$ and $R^7$.

The viscosity of component (a) can vary broadly, e.g., in the range of 30 to 10,000 cps at 25° C. Preferably, it will be in the range of 1,000 to 200,000 cps, and especially preferably, from about 2,000 to 30,000 cps. at 25

The polyalkoxy chain-stopped polydiorganosiloxanes useful as component (a) in the subject invention will be described in connection with a preferred embodiment to be more fully described below.

The tri- or tetrafunctional, hydroxy reactive silane crosslinker component (b) for use in the present invention may be generally represented by the formula:

$$R_m^8 Si(OR^9)_{4-m}$$

wherein $R^8$ is an organic radical of up to 8 carbon atoms selected from hydrocarbyl, halohydrocarbyl and cyano lower alkyl and $R^9$ is an organic radical of 1 to 30 carbon atoms selected hydrocarbyl, halohydrocarbyl, hydrocarbyl and halohydrocarboyl and m has a value of 0 to 3 and preferably 0 to 1.

Illustrative organotrialkoxy silanes useful as crosslinkers in the subject invention include:

CH$_3$ Si (OCH$_3$)$_3$
CH$_3$ Si (OCH$_2$CH$_3$)$_3$
(CH$_3$)$_2$ Si (OCH$_3$)$_2$
(CH$_3$)$_3$Si OCH$_3$

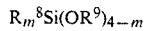—Si (OCH$_3$)$_3$

Si (OCH$_3$)$_4$
CH$_3$CH$_2$CH$_2$CH$_2$CH$_2$CH$_2$CH$_2$CH$_2$Si(OCH$_3$)$_3$
CF$_3$CH$_2$Si(OCH$_3$)$_3$
(CH$_3$) Si (OCH$_2$CH$_2$CH$_2$CH$_3$)$_3$
NC CH$_2$CH$_2$ Si (OCH$_3$)$_3$

These organotrialkoxysilanes are suitably described by Berridge in U.S. Pat. No. 2,184,555, assigned to the same assignee as the present invention.

Illustrative of useful organotriacyloxysilane crosslinking agents for use with the subject invention are the following:

CH$_3$Si (OCO(CH$_2$)$_4$CH$_3$)$_3$
Si (OCO(CH$_2$)$_4$ CH$_3$)$_4$

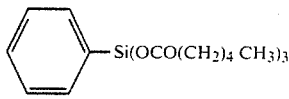—Si(OCO(CH$_2$)$_4$ CH$_3$)$_3$

CH$_3$(CH$_2$)$_6$ CH$_2$ Si (OCO(CH$_2$)$_4$ CH$_3$)$_3$
CF$_3$(CH$_2$)$_3$ Si (OCO(CH$_2$)$_4$ CH$_3$)$_3$
NCCH$_2$ CH$_2$ Si (OCO(CH$_2$)$_4$CH$_3$)$_3$
CH$_3$ Si (OCOCH(C$_2$H$_5$) (CH$_2$) CH$_3$)$_3$

CH$_3$ Si (OCO—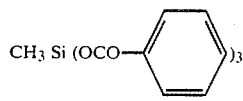)$_3$

These silanes are also well known in the art and can be made by techniques disclosed, for example, in Beers U.S. Pat. No. 3,382,205, assigned to the same assignee as the subject invention.

Preferably in crosslinking agent (b) m has a value of 1 and the preferred silanes for use in the invention are methyltrimethoxy silane, methyl tris-(2-ethylhexanoxy)silane and methyl tris(benzoxy)silane.

Catalyst component (c) may be any catalyst known to be useful for promoting the reactions between the silanol chain-stopped diorganopolysiloxane component (a) and the hydroxy-reactive silane component (b). Generally, these will be metal esters such as dibutyltin diacetate, dibutyltin dibenzoate, dibutyltin adipate, lead octoate, tin rincinoleate, aluminum acetylacetonate, dioctyltin monoacetate, dialkyltin acylates generally, as well as metal chelates. Illustrative of titanium chelate catalysts known to be useful in curing room temperature vulcanizable silicone rubber compositions are:

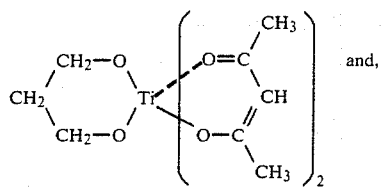

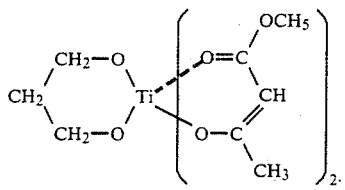

The catalyst (c) is generally present in amounts of between 0.01 and 10.0 parts by weight per 100 parts by weight of component (a), and preferably between 0.02 and 5 parts by weight. Especially preferably, from about 0.05 to about 0.15 parts by weight catalyst will be used for each 100 parts by weight of the overall composition, and the weight ratio of the catalyst to the crosslinking silane will always be at least 0.5 to 1.

The adhesion promoter component (d) of the subject invention is at least one diorganocyclopolysiloxane compound prepared and described above.

The adhesion promoter of the subject invention need only be added in small effective amounts and may generally range from about 0.1 to about 15% by weight based on the weight of the siloxane base polymer present. In preferred embodiments the adhesion promoter composition will be present at between 0.02 to 2 parts of adhesion promoter per hundred parts by weight of component (a). Higher concentrations of adhesion promoter tend to retard the curing of the room temperature vulcanizable silicone composition, so when a fast cure is desired, two parts of adhesion promoter per 100 parts of the silanol or polyalkoxy chain-stopped polydiorganosiloxane should generally be regarded as a maximum.

In addition, the compositions of the subject invention may also include other conventional additives, for example fillers such as silica, especially silazane-treated silica filler; flame retardants, stabilizing agents; pigments; plasticizers, and the like, all added in their conventional amounts.

The compositions of the subject invention are prepared by admixing at room temperature the catalyst, adhesion promoter and the silane with the silanol or polyalkoxy chain-stopped polydiorganosiloxane and other ingredients under anhydrous conditions. Since the silanes tend to hydrolyze upon contact with moisture, care should be exercised to exclude moisture during the addition of the silane to the polydiorganosiloxane. Likewise, care should be taken that the mixture of silane, adhesion promoter, catalyst and the silanol or polyalkoxy chain-stopped polydiorganosiloxane is maintained under substantially anhydrous conditions if it is desired to store the admixture for an extended period of time prior to conversion of the composition to the cured solid elastic silicone rubber state. On the other hand, if it is desired to permit the mixture to cure immediately upon admixture of silane, adhesion promoter, catalyst and the polydiorganosiloxane, no special precautions are necessary and the components can be mixed and placed in the form or shape in which it is desired for the composition to be cured upon exposure to moisture.

The amount of silane crosslinker added to the silanol or polyalkoxy chain-stopped polydiorganosiloxane can vary within wide limits. Satisfactory curing can be obtained, for example, with from 1.0 to 10 moles of the silane per mole of the silanol groups in the polysiloxane. No particular detriment is encountered when using more of the silane per mole of the polydiorganosiloxane, except for a more resinous product being formed and slowing down the cure. The temperature at which the silane crosslinker and the silanol or polyalkoxy chain-stopped polydiorganosiloxane are admixed is not critical and a room temperature addition, e.g., from 18° to 25° C. is usually employed.

Although the order of the addition of the components of the subject compositions is generally not critical, for ease of manufacturing it is often most convenient to form a base blend of all of the components except the silane crosslinker, adhesion promoter and catalyst. The moisture from the base blend may be removed, for example, by maintaining it under vacuum at elevated temperatures of 50°-100° C., and thereafter to add the silane, catalyst and adhesion promoter, just prior to packaging in containers protected from moisture.

The compositions of this invention are stable in the absence of moisture. Consequently, they can be stored for prolonged periods of time without deleterious effect. During this period of storage, no significant change occurs in the physical properties of the room temperature vulcanizing compositions. This is especially advantageous commercially because it insures that once the composition is prepared with a given consistency and cure time, neither change significantly during storage. The compositions of the subject invention are thus extremely valuable and well-suited for one-package systems.

The compositions prepared by mixing the catalyst, silane and adhesion promoter with the silanol chain-stopped polydiorganosiloxane and other ingredients under anhydrous conditions can be used without further modification in many sealing, caulking, adhesive and coating applications merely by placing the compositions in the desired location and permitting them to cure upon exposure to the moisture present in the atmosphere. Upon such exposure, even after previous storage for many months, a "skin" will form on the present compositions within a relatively short time e.g., from 10 minutes to about 8 hours, and they will cure to a rubbery state within from a few hours to several days at room temperatures of about 18° to 25° C.

In a preferred embodiment, a new and improved room temperature vulcanizable silicone composition provided by the subject invention is characterized by the unique combination of properties including low tensile strength, high percent elongation and superior adhesion to various substrates in the cured solid elastomeric state. These preferred compositions comprise:

(a) 100 parts by weight of a silanol chain-stopped polydiorganosiloxane of the formula:

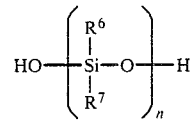

wherein $R^6$ and $R^7$ are each, independently, organic radicals of up to 8 carbon atoms selected from hydrocarbyl, halohydrocarbyl and cyano lower alkyl and n is an average number of from about 10 to 15,000;

(b) from 0.01 to 5.0, preferably, 0.1 to 0.95 parts by weight of a cross-linking silane of the formula:

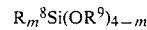

wherein $R^8$ and $R^9$ have the values defined for $R^6$ and $R^7$ hereinabove and m has a value of 0 to 3 and an average value based on the total amount of silane in the composition of 0 to 1.99; and (c) from 0.1 to 10 parts by weight of a silanol reactive organometallic ester compound of a metal the compound having radicals attached to the metal atom, at least one of said radicals being a hydrocarbonoxy radical or a substituted hydrocarbonoxy radical, said radicals being attached to the metal atoms through M—O—C linkages wherein M is the metal and any remaining valences of the metal are satisfied by substituents selected from organic radicals which are attached to the metal atoms through M—O—M linkages, —OH and —O— of a M—O—M linkage, the weight ratio of components (c) to (b) always being greater than 0.5 to 1 and preferably, greater than unity; and (d) from about 0.2 to 2 parts by weight of an adhesion promoter composition per 100 parts of component (a), said adhesion promoting composition comprising at least one compound of the formula:

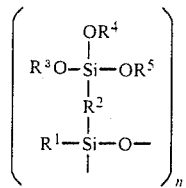

wherein $R^1$ is $C_1$-$C_6$ alkyl, $C_1$-$C_6$ gamma-trihaloalkyl or phenyl; $R^2$ is divalent alkylene of from 2 to 6 carbon atoms; $R^3$, $R^4$ and $R^5$ are, independently, $C_1$-$C_6$ alkanoyl and p is either 3 or 4.

The silanol chain-stopped polydiorganosiloxane component (a) for this embodiment is substantially the same as described above.

The silane cross-linking agent (b) of the formula:

$$R_m^2Si(OR^1)_{4-m}$$

is one which has values for $R^8$ and $R^9$ which are the same as those defined for $R^6$ and $R^7$ above.

Illustrative of such silanes useful in this embodiment of the invention are the following:

CH$_3$Si(OCH$_3$)$_3$
CH$_3$Si(OCH$_2$CH$_3$)$_3$
(CH$_3$)$_2$Si(OCH$_3$)$_2$
(CH$_3$)$_3$Si OCH$_3$

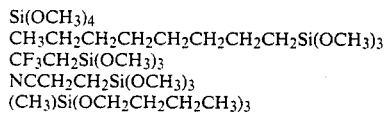

Si(OCH$_3$)$_4$
CH$_3$CH$_2$CH$_2$CH$_2$CH$_2$CH$_2$CH$_2$Si(OCH$_3$)$_3$
CF$_3$CH$_2$Si(OCH$_3$)$_3$
NCCH$_2$CH$_2$Si(OCH$_3$)$_3$
(CH$_3$)Si(OCH$_2$CH$_2$CH$_2$CH$_3$)$_3$

When the silane is employed as a cross-linking agent, m has a value of 1 and the preferred silane is CH$_3$Si(OCH$_3$)$_3$. When it is desired to have a chain-extending agent employed in combination with the cross-linking agent, m has a value of 2 resulting in the silane being difunctional. The preferred difunctional silane is (CH$_3$)$_2$Si(OCH$_3$)$_2$. The presence of a chain-extending agent results in a final cured product having a higher degree of elasticity. The same result would be obtained if a higher molecular weight silanol endstopped fluid were used. Then, however, the curable composition also has a higher viscosity and is very difficult to handle. The modulus of elasticity can be improved still more by using a silane of the above formula wherein m has a value of 3. The preferred silane for this purpose is (CH$_3$)$_3$SiOCH$_3$. The use of such monofunctional silane chain-terminating unit in combination with the cross-linking and optional chain-extending silanes discussed above, not only results in a higher modulus of elasticity but in many instances also provides a further improvement in adhesion of the cured compositions to a substrate.

The preferred silanes of the above formula will contain on the average from 1.05 to 3 silicon-bonded alkoxy groups per silane when a fluid containing two silanol-containing terminal groups is employed. If the number of alkoxy groups are only two, this merely results in a build-up of chain length. Average in this situation means the total number of silicon-bonded alkoxy groups divided by the total number of silane molecules used in the RTV composition.

With respect to silanol reactive organometallic ester component (c), in general types of metals can vary broadly, so long as silicon is not included—because of the need to provide a selectively hydrolyzable Si—O—M bond. Preferably, the metal will be selected from lead, tin, zirconium, antimony, iron, cadmium, barium, calcium, titanium, bismuth, manganese, zinc, chromium, cobalt, nickel, aluminum, gallium or germanium. Most preferably, the metal is titanium. The organometallic compound is preferably an orthoester of a lower aliphatic alcohol, a partially chelated ester of a lower aliphatic alcohol with a β-dicarbonyl compound or a partial hydrolyzate of such compounds which retain at least one hydrocarbonoxy radical or substituted hydrocarbonoxy radical attached to the metal atom through M—O—C linkages.

Especially important are partially chelated organometallic esters and particularly titanium compounds of the formula:

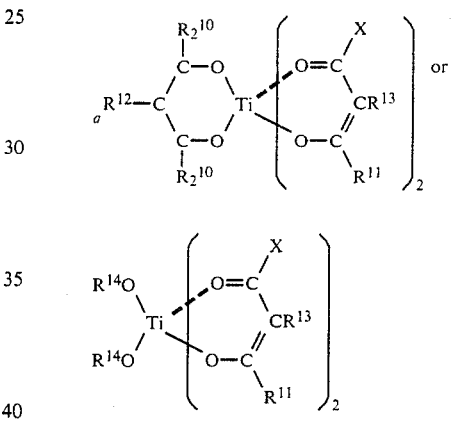

wherein $R^{10}$ is hydrogen, or an organic radical of up to 8 carbon atoms selected from hydrocarbyl, halohydrocarbyl, or carboxyalkyl; $R^{11}$ is a radical of up to 8 carbon atoms selected from hydrocarbyl, halohydrocarbyl and cyano-lower alkyl; $R^{12}$ is selected from the same group as $R^{10}$ and in addition from halo, cyano, nitro, carboxy ester, or acyl and hydrocarbyl substituted by halo, cyano, nitro, carboxy ester and acyl, the total number of carbon atoms in the $R^{10}$ and in the $R^{12}$ substituted alkanedioxy radical being not more than 18; $R^{13}$ is selected from hydrogen or an organic radical of up to 8 carbon atoms selected from hydrocarbyl, halohydrocarbyl, or acyl and, when taken together with $R^{11}$ forms together with the carbon atoms to which they are attached a cyclic hydrocarbon substituent of up to about 12 carbon atoms or such a substituent substituted with one or more of chloro, nitro, acyl, cyano or carboxy ester substituents; X is a radical of up to 20 carbon atoms selected from hydrocarbyl, halohydrocarbyl, cyanoalkyl, alkoxy, haloalkoxy, cyanoalkoxy, amino or ether and polyether groups of the formula —(C$_{2q}$H$_{2q}$O)$_v$R$^{15}$ where q is from 2 to 4, v is from 1 to 20 and $R^{15}$ is alkyl, a is 0 or an integer of up to 8 and, when a is 0, the >C—R$_2^{10}$ groups are bonded to each other in a cyclic fashion, and $R^{14}$ is a radical of up to 8 carbon atoms selected from hydrocarbyl, halohydrocarbyl or cyano-lower alkyl.

These are made by reacting a beta-dicarbonyl compound with a titanium compound, to form a dialkoxy titanium chelate. The dialkoxy titanium chelate can then be reacted with a corresponding alkanediol to produce a wholly cyclic-substituted chelated titanium compound. The preparation of such compounds is described in the above-mentioned U.S. Pat. Nos. 3,689,454 and 3,779,986 and in U.S. Pat. Nos. 3,334,067 and 3,708,467.

Illustrative of such compounds are:

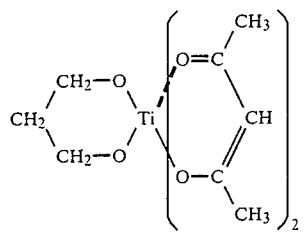

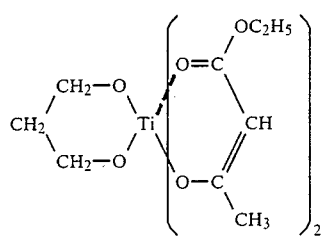

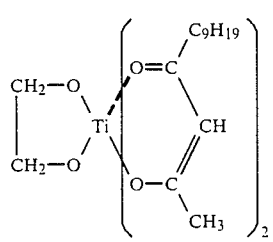

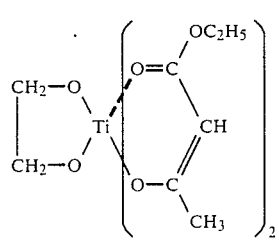

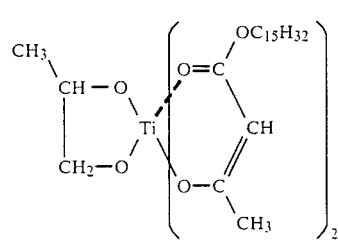

-continued

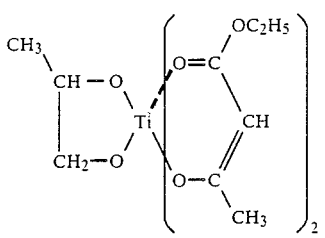

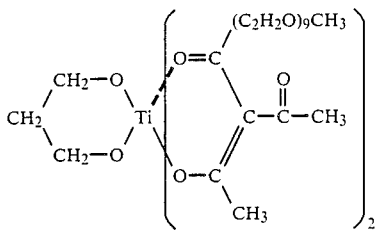

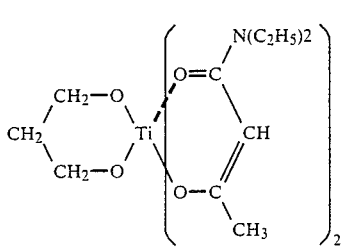

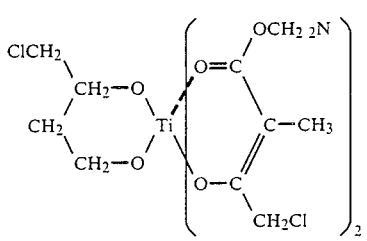

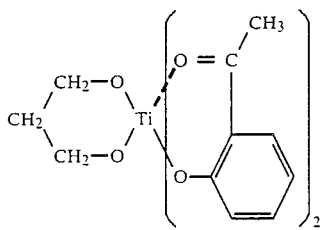

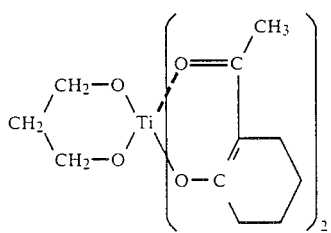

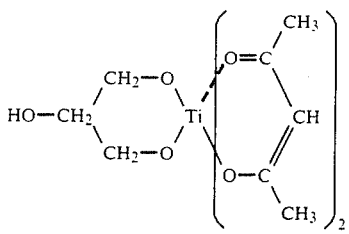

Other examples will be readily apparent from the description of substituents which may be present on the titanium. Most preferably, because of highest elongation, tensile and peel strength, component (c) will have the formula:

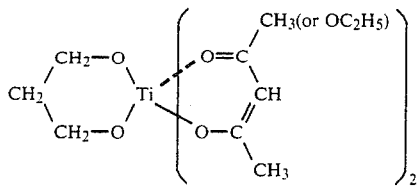

The adhesion promoter component (d) is the same as has been described above.

In addition to the components outlined above, the compositions in accordance with this preferred or any other embodiment may be modified by the incorporation of various extenders or fillers. Illustrative of the many fillers which can be employed with the compositions of the present invention are titanium dioxide, lithopone, zinc oxide, zirconium silicate, silica aerogel, iron dioxide, diatomaceous earth, calcium carbonate, fumed silica, silazane treated silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. Among the most useful fillers are calcium carbonate alone, or mixed with fumed silica. Organosilicone- or silazane-treated silica fillers, such as those described in Lucas, U.S. Pat. No. 2,938,009; Lichtenwalner, U.S. Pat. No. 3,004,859; and Smith, U.S. Pat. No. 3,635,743, are also particularly suitable for use in the RTV compositions of the present invention. The fillers are generally employed in amounts from about 5 to about 200 parts, and preferably, from 10 to about 100 parts by weight per 100 parts of the silanol chain-stopped polydiorganosiloxane component (a).

In addition to fillers these preferred compositions can also include a thixotrope or viscosity depressant in the form of from 0.3 to 20 parts by weight of a low molecular weight linear polydiorganosiloxane. A preferred class of such viscosity depressants are compounds of the formula:

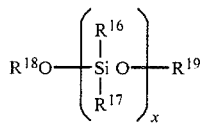

wherein $R^{16}$ and $R^{17}$ are each organic radicals of up to 8 carbon atoms selected from hydrocarbyl, halohydrocarbyl and cyano lower alkyl, $R^{18}$ and $R^{19}$ are, independently, hydrogen or radicals as defined for $R^{16}$ and $R^{17}$ and x has a value of from 2 to 46.

The most preferred such thixotropes are those of the above formula wherein, in the viscosity depressant, $R^{18}$ and $R^{19}$ are methyl, $R^{16}$ and $R^{17}$ are methyl or methyl and phenyl in a ratio of about 70:30, and x is an integer of from 3 to 50.

Additional conventional ingredients can also be included, such as flame retardants, stabilizing agents, pigments, reinforcements, and the like.

The amount of the silane cross-linker component to be mixed with the silanol chain-stopped polydiorganosiloxane can vary within wide limits. However, for best results, it is preferred to add less than one mole of the silane per mole of silanol groups in the silanol chain-stopped polydiorganosiloxane component (a)

Moreover, it is preferred to employ an amount of organometallic ester which provides a total number of moles of silanol reactive ester linkages which is equal to or greater than the total number of moles of terminal silanol groups in the polydiorganosiloxane component (a).

While not intending to be bound by any theory of operation, it is believed that such ratios operate to promote the formation of a silicone base polymer which is completely or partially terminated with organometallic ester linkages, which are silanol reactive and form hydrolytically unstable —Si—O—M bonds in combination with just enough silicone cross-linker functionally to yield the unusual combination of tensile and elongation and the superior adhesion observed in the cured products.

Within the above framework, in the most preferred composition, the weight ratio of components (c) to (b) will be from 1 to 50, and especially preferably, from 1 to 10. Special mention is made of weight ratios for (c) to (b) of from 1 to 5.

Formation of the composition can be carried out by mixing the ingredients along or with conventional fillers, additives, and the like. In certain cases, an inert solvent can be used, i.e., one which will not react with the silanol or alkoxy groups on the silicon. Suitable solvents include hydrocarbons, such as benzene, toluene, xylene, or petroleum ethers; halogenated solvents such as perchloroethylene or chlorobenzene and organic ethers such as diethylether and dibutylether; ketones such as methylisobutylketone and fluid hydroxyl-free polysiloxanes. The presence of a solvent is particularly advantageous when the silanol chain-stopped polydiorganosiloxane component (a) is a high molecular weight gum. The solvent reduces the overall viscosity of the composition and facilitates cure. The RTV compositions may be kept in the solvent until they are to be used. This is particularly valuable when a gummy composition is to be employed in coating applications.

In a second preferred embodiment, a room temperature vulcanizable silicone composition very useful as a gasketing material in automotive applications as well as other areas is provided. These compositions are characterized by low odor, non-corrosive and rapid curing and after they are cured, by high temperature resistance, oil resistance and superior adhesion to substrates. In accordance with this embodiment of the invention, a second polysiloxane containing a high degree of trifunctionality, tetrafunctionality or a mixture of both is incorporated along with the diorganopolysiloxane component (a). A finely divided silica filler, an acyloxy-substituted silane crosslinker, adhesion promoter and optionally thermal stabilizer are also present. More particularly, the low odor, non-corrosive, temperature resistant, adhesive RTV compositions in accordance with this aspect of the invention comprise:

(a) 100 parts by weight of a silanol chain-stopped polydiorganosiloxane of the formula:

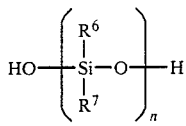

wherein $R^6$ and $R^7$ are each, independently, organic radicals of up to 8 carbon atoms selected from hydrocarbyl, halohydrocarbyl and cyano lower alkyl and n is an average number of from about 10 to 15,000;

(b) from 2 to 20 parts by weight of a fluid polysiloxane containing a high degree of trifunctionality, tetrafunctionality or a mixture of tri- and tetrafunctionality and comprising:

(i) from 25 to 60 mole percent of monoalkylsiloxy units;

(ii) from 1 to 6 mole percent of trialkylsiloxy units; and (iii) from 34 to 74 mole percent of dialkylsiloxy units, said polysiloxane containing from about 0.1 to about 2% by weight of silicon-bonded hydroxyl groups;

(c) from 10 to 100 parts by weight of a finely divided silica filler;

(d) from 3 to 10 parts by weight of a cross-linking silane of the formula:

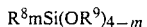

wherein $R^8$ is defined the same as $R^6$ and $R^7$ above and $R^9$ is an organic radical of 6 to 30 carbon atoms selected from hydrocarboyl and halohydrocarboyl, and m has a value of 0 or 1;

(e) from about 0.2 to 2 parts of an adhesion promoter composition per 100 parts of component (a), said adhesion promoting composition comprising at least one compound of the formula:

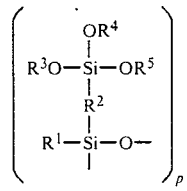

wherein $R^1$ may be $C_1$-$C_6$ alkyl, gamma-trihaloalkyl or phenyl; $R^2$ is a divalent alkylene of from 2 to 6 carbon atoms; $R^3$, $R^4$ and $R^5$ are, independently, $C_1$-$C_6$ alkyl or $C_2$-$C_6$ alkanoyl and p is either 3 or 4;

(f) from 0.01 to 10 parts by weight of a curing catalyst of the group consisting of an organic tin salt or an organic acid and a tin salt of an organic acid, said organic acid containing from 2 to 6 carbon atoms; and (g) optionally, from 1 to 10 parts by weight of a finely divided iron oxide thermal stabilizer.

In accordance with these preferred compositions, component (a), the silanol chain-stopped polydiorganosiloxane is the same as described above.

The highly trifunctional polysiloxane component (b) can be made by means known to those skilled in this art. For example, a mixture of (i) monoalkyl trichlorosilane; (ii) dialkyldichlorosilane and (iii) alkyltrichlorosilane, silicone tetrachloride or a mixture thereof, at the appropriate mole ratio can be run into toluene and water to cohydrolyze them. Then the mixture can be heated, e.g. at about 60° C., for a time sufficient to insure completion of the reaction, generally about 3 hours. The oil phase is separated and neutralized, for example by washing with an aqueous solution of sodium carbonate or bicarbonate. After filtration to remove insolubles and devolatilization, e.g., by heating at about 140° C. under vacuum of about, for instance, 2 mm of mercury, the component (b) remains as the residue. Preferred for economy's sake is to keep the silicon-bonded hydroxyl content to less than 0.6% by weight to minimize the viscosity of the final composition and to keep the cross-linker content to a minimum. This is accomplished by heating the product at 110° C. in the presence of approximately one percent of sodium carbonate. The water from the silanol condensation can conveniently be removed by azeotropic distillation, e.g., with toluene. After removal of the toluene by distillation the product is filtered before use. Beers, U.S. Pat. No. 3,382,205 is incorporated for its illustrative teachings. Component (b) will generally comprise from 2 to 20 parts by weight per 100 parts of component (a) and preferably from about 5 to 15 parts by weight per 100 parts by weight of the composition.

Preferably, component (b) will have a viscosity in the range of 50 to 300 cps. at 25° C. Preferably also in component (b) at least 50 percent of the alkyl substituents are methyl and the fluid comprises from 0.2 to 0.6 percent by weight of silanol. Especially preferably, the monoalkylsiloxy units, siloxy units, or mixed such units comprise about 35 to 45 mole percent, the trialkylsiloxy units comprise from 3 to 5 mole percent, the dialkylsiloxy units comprise from 45 to 67 mole percent and the silanol content is about 0.2 to 0.5 percent by weight.

The silica component (c) is known in the art as a filler for silicone compositions. It is finely divided in form and preferably is a fumed silica having a surface area of about 200 sq. meters/gram. A preferred form will be an organosilicone—or silazane—treated silica such as described in Lucas, U.S. Pat. No. 2,938,009; Lichtenwalner, U.S. Pat. No. 3,004,850; and Smith, U.S. Pat. No. 3,635,743, all of which are incorporated herein by reference. The silica filler (c) is generally employed in amounts of from 10 to 100, preferably from 15 to about 40 parts by weight per 100 parts by weight of component (a), and preferably from 20 to 30 parts by weight per 100 parts by weight of the composition.

The silane crosslinking agent for these preferred RTV compositions will be substantially the same as the triacyloxy substituted silanes described above with the possible limitation that the acyl groups contain between 6 and 30 carbon atoms so as to preclude formation of odorous, corrosive acid by-products during the curing reaction. The silane crosslinking agents are disclosed by Beers in U.S. Pat. No. 3,382,205 and are described above. The preferred silanes for these preferred compositions are methyl tris(2-ethylhexanoxy) silane and methyl tris(benzoxy) silane. The silane is generally used in amounts of from 3 to 10 parts by weight based on 100 parts by weight of component (a) and preferably from 5 to 7 parts by weight on the same basis.

The new and improved adhesion promoter component (e) and the tin-containing curing catalyst component (f) are the same as those described above.

The optional iron oxide thermal stabilizer component (g) is conventionally used and widely available commercially in finely divided form for use as a filler in plastic compositions. Preferably, the iron oxide has a pH in the range of 6.0 to 7.5, to achieve maximum thermal and shelf aging stability. The amount used will be in the range of 1 to 10 parts by weight, based on 100 parts by weight of component (a) and preferably from 3 to 6 parts by weight based on 100 parts by weight of the total composition.

In still another preferred embodiment, the subject invention provides new and improved one package moisture curable, room temperature vulcanizing silicone compositions having improved shelf stability and which in a cured state exhibit superior adhesion to substrates. In accordance with this embodiment new and improved RTV compositions comprise:

(a) 100 parts by weight of a silanol terminated polydiorganosiloxane of the formula:

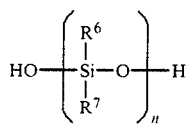

wherein $R^6$ and $R^7$ are each, independently, organic radicals of up to 8 carbon atoms selected from hydrocarbyl, halohydrocarbyl and cyano lower alkyl and n is an average number of from about 50 to about 2500;

(b) a scavenging silane of the formula:

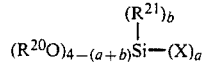

wherein $R^{20}$ is a ($C_1$-$C_8$) aliphatic organic radical selected from alkyl radicals, alkylether radicals, alky ester radicals, alkylketone radicals, alkylcyano radicals or a $C_7$-$C_{13}$ aralkyl radical, $R^{21}$ is a $C_1$-$C_{13}$ monovalent organic radical selected from substituted or unsubstituted hydrocarbon radicals, preferably methyl, phenyl or vinyl and X is a hydrolyzable leaving group selected from amido, amino, carbamato, enoxy, imidato, isocyanato, oximato, thioisocyanato and ureido radicals, a is an integer equal to 1 or 2 and when a is equal to 2, X can be the same or different, b is a whole number equal to 0 or 1 and the sum of (a+b) is equal to 1 or 2, said scavenging silane being present in an amount sufficient to scavenge available —OH groups in the overall composition and provide up to 3% by weight excess, based on the weight of the overall composition;

(c) from 0 to 10 parts by weight of a cross-linking silane of the formula:

$$(R^{15}O)_{4-a}Si(R^{16})_a$$

wherein $R^{15}$ is a $C_1$-$C_8$ aliphatic organic radical selected from the group of radicals consisting of alkyl, alkylether, alkylester, alkylketone, and alkylcyano, or is a $C_7$-$C_{13}$ aralkyl radical, $R^{16}$ is a $C_1$-$C_{13}$ monovalent organic radical selected from substituted or unsubstituted hydrocarbon radicals and is; a whole number equal to 0 or 1;

(d) an effective amount of a condensation catalyst;
(e) from about 0 to 5 parts by weight of a curing accelerator selected from substituted guanidines, amines and mixtures thereof;
(f) an effective adhesion promoting amount of an adhesion promoter composition comprising at least one compound of the formula:

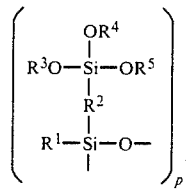

wherein $R^1$ is $C_1$-$C_6$ alkyl, $C_1$-$C_6$ gamma-trihaloalkyl or phenyl, $R^2$ is alkylene of from 2 to 6 carbon atoms; $R^3$, $R^4$ and $R^5$ are independently $C_1$-$C_6$ alkyl or $C_2$-$C_6$ alkanoyl and p is either 3 or 4; and (g) optionally from 0 to 700 parts by weight based upon the weight of the component (a) of filler.

The silanol terminated polydiorganosiloxane component (a) of these preferred compositions is substantially the same as that described above.

The scavenging silane component (b) in accordance with this embodiment improves the shelf stability of the RTV composition by removing chemically combined hydroxyl radicals and is operative to eliminate undesirable water present in the filler or silicone polymer as well as any residual moisture in the RTV composition during the shelf period. The leaving group X reacts preferentially before alkoxy groups with available —OH in the RTV composition and provides an RTV composition substantially free of halogen acid or carboxylic acid.

More particularly, the scavenging silane component (b) acts as both a silane scavenger for hydroxy functional groups and as a polyalkoxysilane cross-linking agent for terminating the silicon atom at each organopolysiloxane chain-end with at least two alkoxy radicals. The hydroxy radicals which can be removed by the silane scavenger can be found in materials normally present in RTV compositions, for example, trace amounts of water, methanol, silanol radicals on the filler (if used) and the silanol-terminated polydiorganosiloxane polymer.

Among the ingredients of the RTV composition formed as a result of the use of the scavenging silane component (b) is a silanol-free polydiorganosiloxane, chain terminated with two or three —$OR^{20}$ radicals. More particularly, the use of scavenging silane (b) produces a polyalkoxy-terminated organopolysiloxane having the formula:

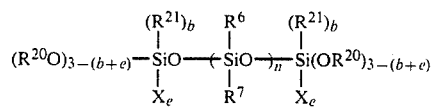

wherein $R^6$, $R^7$, $R^{20}$, $R^{21}$, X and n all have the values previously defined, b is a whole number equal to 0 or 1, e is equal to 0 or 1 and the sum of b+e is equal to 0 or 1.

These polyalkoxy-terminated organopolysiloxanes may be prepared in other ways, for example, instead of using the scavenging silane (b) of this embodiment as an endcapper for a silanol-terminated polydiorganosiloxane as taught herein, a polyalkoxy-terminated organopolysiloxane can be prepared by combining a silanol-terminated polydiorganosiloxane and a polyalkoxysilane in the presence of an amine catalyst as taught by Cooper et al in U.S. Pat. No. 3,542,901, incorporated herein by reference.

It is not completely understood why the polyalkoxy-terminated organopolysiloxane compositions produced in this embodiment of the invention are stable in the presence of certain condensation catalysts over an extended period of time in the substantial absence of moisture.

A mechanistic study of the RTV of the present embodiment supports the theory that the use of scavenging silane component (b) alone or in combination with crosslinking silane of component (c), in accordance with the practice of the invention, minimizes the likelihood that detrimental amounts of $R^{20}OH$ will be generated during the shelf period. $R^{20}OH$ generation is to be avoided because $R^{20}OH$ endstops the silanol polymer to produce polymers having terminal

units. These polymers, wherein the silicon atom at each polymer chain end is terminated with only one alkoxy radical, have slow cure times. In addition, $R^{20}OH$ can breakdown the organopolysiloxane polymer in the presence of the condensation catalyst.

Illustrative of some of the scavenging silanes useful as component (b) in this embodiment of the invention are:
Oximatosilanes such as,
methyldimethoxy(ethylmethylketoximo)silane;
methylmethoxybis-(ethylmethylketoximo)silane;
methyldimethoxy(acetaldoximo)silane.
Carbamatosilanes such as,
methyldimethoxy(N-methylcarbamato)silane;
ethyldimethoxy(N-methylcarbamato)silane.
Enoxysilanes such as,
methyldimethoxyisopropenoxysilane;
trimethoxyisopropenoxysilane;
methyltri-iso-propenoxysilane;
methyldimethoxy(but-2-ene-2-oxy)silane;
methyldimethoxy(1-phenylethenoxy)silane;
methyldimethoxy-2(1-carboethoxy-propenoxy)silane.
Aminosilanes such as,
methylmethoxydi-N-methylaminosilane;
vinyldimethoxymethylaminosilane;
tetra-N,N-diethylaminosilane;
methyldimethtoxymethylaminosilane;
methyltricyclohexlaminosilane;
methyldimethoxyethylaminosilane;
dimethyldi-N,N-dimethylaminosilane;
methyldimethoxyisopropylaminosilane    dimethyldi-N,N-diethylaminosilane.
Amidosilanes such as,
ethyldimethoxy(N-ethylpropionamido)silane;
methylmethoxydi(N-methylacetamido)silane;
methyldimethoxy(N-methylacetamido)silane;
methyltris-(N-methylacetamido)silane;
ethyldimethoxy(N-methylacetamido)silane;
methyltris-(N-methylbenzamido)silane;
methylmethoxybis(N-methylacetamido)silane;
methyldimethoxy(caprolactamo)silane;
trimethoxy(N-methylacetamido)silane.
Imidatosilanes such as,
methyldimethoxyethylacetimidatosilane;
methyldimethoxypropylacetimidatosilane.
Ureidosilanes such as,
methyldimethoxy(N,N',N'-trimethylureido)silane;
methyldimethoxy(N-allyl-N',N'-dimethylureido)silane;
methyldimethoxy(N-phenyl-N',N'-dimethylureido)silane.
Isocyanatosilanes such as,
methyldimethoxyisocyanatosilane    dimethtoxydiisocyanatosilane.
Thioisocyanatosilanes such as,
methyldimethoxythioisocyanatosilane;
methylmethoxydithioisocyanatosilane.

Still other useful scavenging silanes include methyltris(N-methylacetamido)-silane; tetra(isopropenoxy)silane and silanes having different leaving groups such as diethylamino(N-methylcarbamato)isopropenoxy(N-allyl-N',N'-dimethylureido)silane.

In determining the amount of scavenging silane component (b) to use in the practice of this embodiment of the invention, the total hydroxy functionality of the RTV composition can be estimated. The total hydroxy functionality of the polymer component (a) can be determined by infra red analysis. In order to insure that an effective or stabilizing amount of scavenger is used to maintain the stability of the composition over an extended shelf period of six months or more at ambient temperature while in a sealed container, there can be added an additional amount of scavenger over that amount required to endstop the polymer. This excess of scavenger can be up to about 3% by weight, based on the weight of the polymer. The aforementioned 3% of scavenger by weight exceeds that amount required to substantially eliminate available hydroxy functionality in the polymer as a result of reaction between OH functionality and X radicals. In composititons which also contain filler and other additives, the additional amount of scavenger which is required is estimated by running a 48 hour stability check at 100° C. to determine whether the tack-free time remains substantially unchanged as compared to the tack-free time of the composition before aging measured under substantially the same conditions.

The crosslinking silane component (c) is substantially the same as the tri- or tetrafunctional polyalkoxy silanes described above. Examples of suitable crosslinking silanes useful herein as component (c) include: methyltrimethoxysilane, methyltriethoxysilane, ethyltrimethoxysilane, tetraethoxysilane, vinyltrimethoxysilane and the like.

The condensation catalysts useful as component (d) herein are well known in the art and generally include metal compounds selected from tin compounds, zirconium compounds and titanium compounds or mixtures thereof.

Effective amounts of the condensation catalysts, which can be used in the practice of this preferred embodiment to facilitate the cure of the RTV compositions are, for example, 0.001 to 1 part based on the weight of 100 parts of a silanol-terminated polydiorganosiloxane component (a). More particularly and by way of illustration, the condensation catalyst may be a tin compound for example, dibutyltindilaurate; dibutyltindiacetate; dibutyltindimethoxide, carbomethoxyphenyltin tris-suberate; tin octoate, isobutyltin triceroate; dimethyltin dibutyrate; dimethyltin dineodecanoate; triethyltin tartrate; dibutyltin dibenzoate; tin oleate; tin naphthenate; butyltintri-2-ethylhexoate; tinbutyrate. The preferred condensation catalysts are tin compounds and dibutyltindiacetate is particularly preferred.

Titanium compounds which can be used are, for example, 1,3-dioxypropanetitanium bis(acetylacetonate); diisopropoxytitanium bis(acetylacetonate); titanium naphthenate; tetrabutyltitanate; tetra-2-ethylhexyltitanate; tetra-phenyltitanate; tetraoctadecyltitanate; ethyltriethanolaminetitanate. In addition beta-dicarbonyltitanium compounds as shown by Weyenberg U.S. Pat. No. 3,334,067 can be used as condensation catalysts in the present invention.

Zirconium compounds, for example, zirconium octoate, also can be used.

Further examples, of metal condensation catalysts are, for example, lead 2-ethyloxtoate; iron 2-ethylhexoate; cobalt 2-ethylhexoate; manganese 2-ethylhexoate; zinc 2-ethylhexoate; antimony octoate; bismuth naphthenate; zinc naphthenate; and zinc stearate.

Examples of nonmetal condensation catalysts are hexylammonium acetate and benzyltrimethylammonium acetate.

It has been further found that improved cure rates can be achieved if minor amounts of amines, substituted guanidines, or mixtures thereof, are utilized as curing accelerators in the polyalkoxy compositions of the instant embodiment. These curing accelerators also serve to catalyze the ability of the enoxy leaving group to act as a scavenger. There can be used from 0.1 to 5 parts, and preferably from about 0.3 to 1 part of curing accelerator, per 100 parts of the silanol-terminated polymer component (a) or 100 parts of the polyalkoxy-terminated polymer of Cooper in U.S. Pat. No. 3,542,901 described above to substantially reduce the tack-free time (TFT) of the RTV composition of the present embodiment. This enhanced cure rate is maintained after it has been aged for an extended shelf period, for example, 6 months or more at ambient temperatures, or a comparable period under accelerated aging conditions. Its cure properties after the extended shelf period will be substantially similar to its initial cure properties, for example, tack-free time (TFT), shown by the RTV composition upon being freshly mixed and immediatly exposed to atmospheric moisture.

It appears that the curing accelerators, described more fully below, in addition to decreasing the tack-free times of the RTV compositions of this invention, also provide a surprising stabilizing effect for particular RTV compositions catalyzed with certain condensation catalysts which exhibit a marked lengthening of tack-free time after accelerated aging. For this class of condensation catalysts, addition of amines, substituted guanidines and mixtures thereof described herein provide stable RTV compositions which exhibit a fast cure rate initially, i.e. less than about 30 minutes which remains substantially unchanged after accelerated aging.

Among the curing accelerators useful as component (e) herein are the silyl substituted guanidines having the formula,

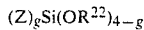

wherein $R^{22}$ is a $C_1-C_8$ aliphatic organic radical selected from radicals of the group consisting of: alkyl, alkylether, alkylester, alkylketone and alkylcyano, or a $C_7-C_{13}$ aralkyl radical and Z is a guanidine radical of the formula,

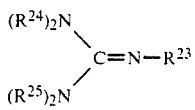

where $R^{23}$ is divalent $C_{(2-8)}$ alkylene radical, $R^{24}$ and $R^{25}$ are selected from hydrogen and $C_1-C_8$ alkyl radicals and g is an integer equal to 1 to 3 inclusive. In addition, alkyl substituted guanidines having the formula

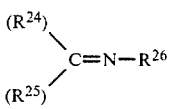

where $R^{24}$ and $R^{25}$ are as previously defined and $R^{26}$ is a $C_1-C_8$ alkyl radical, also can be employed. Some of the silyl substituted guanidines included within formula above are shown by Takago U.S. Pat. Nos. 4,180,642 and 4,248,993.

In addition to the above substituted guanidines, there can be used various amines, for example di-n-hexylamine, dicyclohexylamine, di-n-octylamine, hexamethoxymethylmelamine, and silylated amines, for example, gamma-aminopropyltrimethoxysilane and methyldimethoxy-di-n-hexylaminosilane. Methyldimethoxy-di-n-hexylaminosilane acts as both a scavenger and curing accelerator. The primary amines, secondary amines, silylated secondary amines are preferred, and secondary amines, and silylated secondary amines are particularly preferred. Silylated secondary amines such as alkyldialkoxy-n-dialkylaminosilanes and guanidines such as alkyldialkoxyalkylguanidylsilanes which are useful as cure accelerators herein also act as scavengers and, in certain instances, as stabilizers in the compositions of this invention.

The adhesion promoter component (f) is the same as that prepared and disclosed herein above.

The optional component (g) fillers for use in this embodiment of the invention have already been described in part above. Generally, various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of this embodiment of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example stirring, a mixture of materials which can consist of the silanol terminated polydiorganosiloxane, component (a), along with the scavenging silane of component (b), and cross-linking silane of component (c), where the blending is performed in the substantial absence of atmospheric moisture. Thereafter the condensation catalyst (d) is added also in the substantial absence of atmospheric moisture.

As used herein, the expression "moisture-free conditions", with reference to making the RTV compositions of the present invention, means mixing in a dry box, or in a closed container which has been subjected to vacuum to remove air, which thereafter is replaced with a dry inert gas, such as nitrogen. Experience has shown that sufficient scavenging silane of component (b) should be utilized as previously defined. Temperatures can vary from about 0° C. to about 180° C. depending upon the degree of blending, the type and amount of filler.

A preferred procedure for making the RTV composition of the present invention is to agitate under substantially anhydrous conditions, a mixture of the silanol terminated polydiorganosiloxane, filler and an effective amount of the scavenging silane sufficient to effect the substantial elimination of hydroxy functional radicals and to end cap the polymer. This "end capping" and scavenging procedure can require several minutes, hours, or even days, depending upon such factors as the nature of the X leaving group, the number of $-OR^{20}$ radicals on the scavenging silane, etc. There then can be added to the substantially silanol-free mixture, the condensation catalyst, the cross-linking silane, the adhesion promoter, or mixtures thereof, along with other ingredients, for example, the curing accelerator and pigments. A stabilizing excess of the scavenging silane can be used in the initial or final stages of the mixing procedure, if desired in amounts previously defined.

The new and improved room temperature vulcanizable silicone compositions of the subject invention are particularly suitable for caulking and sealing applications where excellent adhesion to a variety of substrates is important. For example, the compositions are useful in household and industrial caulking and sealing in building, factories, transportation vehicles, and the like and with substrates such as masonry, glass, ceramics, plastic, metal, wood, and the like. The compositions are also advantageous in having excellent rates of application, making them readily suitable for application from conventional caulkers under standard conditions.

In order that those skilled in the art may more fully understand and practice the subject invention the following Examples are provided to further describe the new and improved compositions and should not be construed as limiting the invention.

EXAMPLE I

A diorganocyclopolysiloxane adhesion promoter compound in the form of 1,3,5,7-tetramethyl-1,3,5,7-tetrakis-2-trimethoxysilylethylcyclotetrasiloxane was prepared as described below.

An approximately 20% solution of methylhydrogencyclotetrasiloxane was prepared by dissolving 24.1 grams of the methylhydrogen tetramer in 87 grams of toluene in a 3-necked, 3-liter flask equipped with a magnetic stirrer, thermometer, condenser and dropping funnel. The system was purged with and kept under a blanket of nitrogen gas. 59.3 grams of vinyltrimethoxysilane were placed in the dropping funnel. The system was heated to reflux and three drops of a platinum vinyl siloxane complex catalyst of the type prepared and described by Karstedt, U.S. Pat. No. 3,775,452, were added. Thereafter, the vinyltrimethoxysilane was added at a fairly rapid rate while maintaining a controlled but vigorous reflux. The total time for addition of the vinyltrimethoxysilane was about 2 hours.

Thereafter, the system was refluxed for an additional 2 hours. The toluene and any excess vinyltrimethoxysilane was stripped by heating to a pot temperature of 100° C. under a vacuum of approximately 5 torr.

An IR scan of the residue showed little Si—H or Si-vinyl groups and the spectra obtained looked to be consistent with the theoretical structure. The 1,3,5,7-tetramethyl-1,3,5,7-tetrakis-3-trimethoxysilylethylcyclotetrasiloxane residue was recovered and placed in a storage bottle.

EXAMPLE II

The procedure of Example I is followed with the exception that a 20% solution of methylhydrogencyclotrisiloxane was prepared by dissolving 18 grams of the methylhydrogen cyclotrimer in 87 grams of toluene; and 44.5 grams of vinyltrimethoxysilane were reacted therewith. A 1,3,5-trimethyl-1,3,5-tris-2-trimethoxysilylethylcyclotrisiloxane product, confirmed by infra red spectroscopy, was obtained.

EXAMPLE III

A low modulus, one package, moisture curable, room temperature vulcanizable silicone composition exhibiting superior adhesion to substrates was prepared as described below.

A base compound was prepared by mixing in order in a 1 gallon Baker-Perkins Change Can mixer the following:

| COMPONENT | PARTS BY WEIGHT |
|---|---|
| a silanol-terminated polydimethylsiloxane (100,000 cps. viscosity at 25° C.) | 100 |
| methyl-stopped silicone oil with high silanol content 1. (100 cps at 25° C.) | 40 |
| methyl-phenyl fluid (5% phenyl) | 5 |
| dimethylsiloxane treated fumed silica having a surface area of 200 m²/gm | 12 |
| calcium carbonate | 120 |
| off-white pigment combination | 5.7 |

1. SF 96 (100), available from the General Electric Company.

The above ingredients were blended with stirring at atmospheric pressure until the fillers were completely wetted. When the fillers had been wetted, a vacuum of 15 torr was applied and the mixing process was continued for a period of one hour.

A catalyst mixture was prepared by admixing the following:

| CATALYST MIXTURE | |
|---|---|
| COMPONENT | PARTS BY WEIGHT |
| methyltrimethoxysilane | 1.5 |
| 1,3-dioxypropanetitanium-bis(acetylacetonate) | 1.8 |
| 1,3,5,7-tetramethyl-1,3,5,7-tetrakis-trimethoxysilylethylcyclotetrasiloxane (prepared as in Example I) | 0.75 |

A moisture curable room temperature vulcanizing silicone composition was prepared by adding 40 grams of catalyst mixture to 1000 grams of the base compound in a Semco catalyzer and the resulting product was stored in a Semco tube for a period of three days. The curable silicone composition had a specific gravity of 1.39 and when applied from the Semco tube on a Teflon substrate to form a test patch at an application rate of 180 grams/minute, the composition had a Boeing flow rate of 0.08 inches and cured in the presence of atmospheric moisture to a tack free state in about 8 hours.

After a period of three (3) days; molded slabs were prepared by spreading the silicone composition in rectangular 6"×6"×0.070" molds. The molded slabs were exposed to atmospheric moisture and allowed to cure at room temperature (72°±2° F.) and at 50%±5% relative humidity for three days.

Die cut dumbell test specimens, $\frac{1}{4}''$ wide in the center portion, were then evaluated for physical properties in accordance with standard testing procedures. The test specimens were evaluated for Shore A hardness in accordance with ASTM D 2240-75 by impacting the surface of the test specimen with a conically shaped indentor provided with a known force by a durometer spring. The depth of indentation or penetration of the indentor is inversely related to the hardness of the test specimen. The depth of indentation is measured and the value is assigned to an artificial hardness scale of from 0 to 100; 0 being equivalent to full penetration and 100 being equal to no penetration.

The test specimens were also tested for tensile strength and percent elongation, in accordance with ASTM D 412-80. This testing procedure involves placing the opposed ends of the test specimen within the grips of a testing machine designed to apply a constant force on the test specimen by outward movement of the grips in opposed directions. Prior to stress testing, two bench marks of measured separation are placed on the test specimen. The testing machine is activated and the sample is stretched until a break occurs. The tensile strength of the sample is equal to the force required to break the test specimen divided by the area of the test specimens and is expressed in pounds per square inch. The tensile elongation, percent, is a measure of tolerance to stretching and is derived from the formula:

| Elongation, % = | $[(L - L_o)/L_o] \times 100$ |
|---|---|
| wherein, L = | the observed distance between the bench marks on the stretched test specimen at break, and |
| $L_o$ = | the original distance between the bench marks. |

The test specimens were also evaluated for peel adhesion under ASTM C 794-75. For purposes of this evaluation several different kinds of substrates were used. In accordance with this testing procedure, a thin layer of the composition is placed on the substrate. A cloth or wire mesh imbedded with the composition is placed on top of the coated substrate and a second thin layer of the composition is spread over the cloth or mesh and the entire assembly allowed to cure. The peel adhesion of the composition was tested by peeling back the cloth or mesh at 180° and the force required to break the adhesive bond between cloth and sealant was measured. Also measured was the percentage of the substrate which was still covered with the cured composition. Ideally, the entire surface of the specimen is coated with the cured silicone composition and 100% of the failure is of the cohesive type. If only a portion of the test patch was still covered, the percentage covered was recorded as a measure of the cohesive failure. In other words, 100% cohesive failure indicates superior adhesion between the composition and the substate, 0% cohesive failure indicates that the composition bonds itself preferentially over bonding to the substrate.

The composition had the following physical properties:

| Shore A hardness | 25 |
|---|---|
| tensile strength, psi | 225 |
| Elongation, % | 720% |

Peel adhesion tests were performed by preparing panels on the following substrates which were permitted to cure for a period of 10 days and 25 days. The following results were obtained.

| | PEEL ADHESION RESULTS | |
|---|---|---|
| SUBSTRATE | 10 DAY CURE | 25 DAY CURE |
| Stainless Steel | | |
| peel strength, psi | 26 | 39 |
| cohesive failure | 50% | 60% |
| Galvanized Steel | | |
| peel strength, psi | 37 | 55 |
| cohesive failure | 65% | 100% |
| Annodized Aluminum | | |
| peel strength | 52 | 50 |
| cohesive failure | 100% | 98% |
| Alclad Aluminum | | |
| peel strength, psi | 16 | 33 |
| cohesive failure | 5% | 40% |
| Polyvinyl Chloride | | |
| peel strength, psi | 54 | 53 |
| cohesive failure | 100% | 96% |
| Polymethacrylate | | |
| peel strength, psi | 48 | 50 |
| cohesive failure | 100% | 100% |
| Plate Glass | | |
| peel strength, psi | 51 | 54 |
| cohesive failure | 100% | 100% |
| Concrete | | |
| peel strength, psi | 50 | 55 |
| cohesive failure | 95% | 100% |

When comparative testing was performed with a composition identical in all respects to the above formulation but with the exception that instead of the 1,3,5,7-tetramethyl-1,3,5,7-tetrakis-2-trimethoxysilylethylcyclotetrasiloxane adhesion promoter, the prior art 1,3,5-tris-trimethoxysilylpropylisocyanurate adhesion promoter was blended into the catalyst mixture, it was discovered that the compositions of this invention exhibited at least as good, and in many cases better, adhesion to the same set of substrates.

The composition prepared in accordance with the present invention exhibited 100% cohesive failure in most instances and exhibited very satisfactory adhesion to a variety of substrates.

EXAMPLE IV

A 1,3,5,7-tetramethyl-1,3,5,7-tetrakis-2-trimethoxysilylethylcyclotetrasiloxane adhesion promoter was prepared in accordance with Example I.

A second linear polysiloxane adhesion promoter was prepared for comparative purposes as follows:

241 grams of trimethyl endstopped polymethylhydrogensiloxane having a general formula:

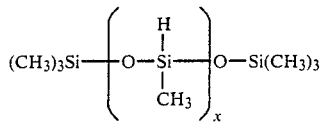

wherein x has an average value of about 20, and 650 mls. of toluene were placed in a 3-neck 3-liter flask equipped with a magnetic stirrer, thermometer, condenser and dropping funnel. The system was purged and kept under a blanket of nitrogen gas. 650 grams of vinyltrimethoxy silane were placed in the dropping funnel. The system was heated to reflux and six drops of a platinum vinyl siloxane complex catalyst were added. The vinyl trimethoxysilane was added fairly rapidly while maintaining a controlled but vigorous reflux, the total time for the addition being about 2 hours. The system was refluxed for an additional 2 hours. The toluene and excess vinyltrimethoxysilane was stripped by heating to a pot temperature of 100° C. under decreased pressure of about 7 mm Hg. An IR scan of the residue showed little Si—H or Si-vinyl groups.

A third adhesion promoter, the 1,3,5-tris-trimethoxysilylpropylioscyanurate of the prior art, prepared as described in Berger, U.S. Pat. No. 3,517,001, was obtained.

A base compound was prepared as in Example III.

The following four catalyst mixtures were prepared by admixing the following components:

| COMPONENT (PARTS BY WEIGHT) | CATALYST MIXTURE | | | |
|---|---|---|---|---|
| | A* | B** | C*** | D**** |
| methyltrimethoxysilane | 1.5 | 1.5 | 1.5 | 1.5 |
| 1,3-dioxypropanetitanium bis(acetyl acetonate) | 1.8 | 1.8 | 1.8 | 1.8 |
| 1,3,5,7-tetramethyl-1,3,5,7-tetrakis-2-trimethoxysilylethylcyclotetrasiloxane | — | — | 0.75 | — |
| trimethyl-endstopped poly(methyl-2-trimethoxysilylethylsiloxane) | — | — | — | 0.75 |
| 1,3,5-tris-trimethoxysilylpropyl-isocyanurate | — | 0.75 | — | — |

*control - no adhesion promoter added
**prior art adhesion promoter
***within the scope of this invention
****comparative linear polysiloxane adhesion promoter added.

The following moisture curable, one package room temperature vulcanizing silicone compositions were mixed in a Semco catalyzer and stored in Semco tubes for three days as in Example III.

| RTV COMPOSITIONS | | | | |
|---|---|---|---|---|
| COMPONENTS (PARTS BY WEIGHT) | 2* | 3** | 4*** | 5**** |
| Base Compound | 120 | 120 | 120 | 120 |
| Catalyst Mixture | | | | |
| A | 4.0 | — | — | — |
| B | — | 4.8 | — | — |
| C | — | — | 4.8 | — |
| D | — | — | — | 4.8 |

*control - no adhesion promoter
**prior art adhesion promoter added
***within the scope of this invention
****comparative linear polysiloxane adhesion promoter.

The compositions were evaluated for physical properties in accordance with the procedure described in Example III and the following results were obtained:

| RTV COMPOSITIONS | | | | |
|---|---|---|---|---|
| Physical Properties | 2 | 3 | 4 | 5 |
| tack free time (hrs) | 8.0 | 7.5 | 7.5 | 7.5 |
| application rate (gms/min.) | 210 | 184 | 176 | 174 |
| boeing flow rate (in.) | 0.12 | 0.10 | 0.10 | 0.14 |
| specific gravity | 1.39 | 1.39 | 1.39 | 1.39 |
| shore A hardness (durometer) | 23 | 22 | 23 | 20 |
| tensile strength (psi) | 212 | 225 | 223 | 207 |
| elongation (%) | 890 | 890 | 870 | 915 |

| PEEL ADHESION RESULTS | | | | |
|---|---|---|---|---|
| | RTV COMPOSITION | | | |
| SUBSTRATE | 2* | 3** | 4*** | 5**** |
| A. Stainless Steel | | | | |
| 10 day cure | | | | |
| peel strength, psi | 6 | 43 | 38 | 24 |
| cohesive failure | 5% | 60% | 70% | 20% |
| 25 day cure | | | | |
| peel strength, psi | 63 | 48 | 60 | 49 |
| cohesive failure | 85% | 100% | 100% | 100% |
| B. Anodized Aluminum | | | | |
| 10 day cure | | | | |
| peel strength, psi | 7 | 48 | 46 | 21 |
| cohesive failure | 5% | 90% | 80% | 20% |
| 25 day cure | | | | |
| peel strength, psi | 24 | 54 | 58 | 49 |
| cohesive failure | 20% | 90% | 90% | 100% |
| C. Alclad Aluminum | | | | |
| 10 day cure | | | | |
| peel strength, psi | 6 | 19 | 15 | 20 |
| cohesive failure | 0% | 10% | 10% | 10% |
| 25 day cure | | | | |
| peel strength, psi | 46 | 56 | 56 | 58 |
| cohesive failure | 60% | 85% | 90% | 90% |
| D. Polymethacrylate | | | | |
| 10 day cure | | | | |
| peel strength, psi | 32 | 42 | 53 | 50 |
| cohesive failure | 30% | 100% | 100% | 100% |
| 25 day cure | | | | |
| peel strength, psi | 9 | 56 | 64 | 55 |
| cohesive failure | 10 | 100% | 100% | 100% |
| E. Glass | | | | |
| 10 day cure | | | | |
| peel strength, psi | 10 | 44 | 44 | 52 |
| cohesive failure | 5% | 100% | 100% | 100% |
| 25 day cure | | | | |
| peel strength, psi | 48 | 45 | 53 | 57 |
| cohesive failure | 100% | 100% | 100% | 100% |
| F. Concrete | | | | |
| 10 day cure | | | | |
| peel strength, psi | 38 | 55 | 58 | 49 |
| cohesive failure | 100% | 100% | 100% | 100% |

-continued

| PEEL ADHESION RESULTS | | | | |
|---|---|---|---|---|
| | RTV COMPOSITION | | | |
| SUBSTRATE | 2* | 3** | 4*** | 5**** |
| 25 day cure | | | | |
| peel strength, psi | 48 | 52 | 55 | 48 |
| cohesive failure | 100% | 100% | 100% | 100% |

*control - no adhesion promoter added
**prior art adhesion promoter added
***within the scope of this invention
****comparative linear polysiloxane adhesion promoter The above results illustrate that the new and improved RTV silicone compositions of the subject invention incorporating the 1,3,5,7-tetramethyl-1,3,5,7-tetrakis-2-trimethoxysilylethylcyclotetrasiloxane adhesion promoter of the subject invention, Composition 4, exhibited superior adhesion to a variety of substrates as compared with Composition 2, an identical RTV composition containing no adhesion promoter additive; and in most instances, exhibited at least as good and often superior peel strength adhesion and cohesive failure to the substrate as compared with Composition 3, the identical RTV composition containing the more expensive 1,3,5-tris-trimethoxysilylpropylisocyanurate adhesion promoter of the prior art. Further, the cyclotetrasiloxane adhesion promoter of Composition 4, showed unexpected improvements in peel strength adhesion and cohesive failure to the majority of substrates as compared with Composition 5, an identical RTV composition containing as an adhesion promoter a corresponding linear polysiloxane provided with identical substituent groups. With respect to substrates of Alclad aluminum and plate glass, Composition 5 did exhibit slightly higher peel strength over Composition 4 of the subject invention, however each composition showed the same cohesive failure for these particular substrates.

EXAMPLE V

The following room temperature vulcanizable compositions were prepared from the following base compound and catalyst compositions in accordance with the procedures of Examples III and IV.

| BASE COMPOUND | |
|---|---|
| COMPONENT | PARTS BY WEIGHT |
| silanol chain stopped polydimethylsiloxane (viscosity 8,000 cps at. 25° C.) | 100 |
| methyl stopped silicone oil with high silanol content (50 cps. at 25° C.) | 10 |
| Treated Fumed Silica Filler | 26 |
| titanium dioxide pigment | 1 |

The following three catalyst mixtures were prepared:

| CATALYST MIXTURES | | | |
|---|---|---|---|
| COMPONENT (Parts by Weight) | E | F | G |
| methyltrimethoxysilane | 225 | 225 | 225 |
| 1,3-dioxypropanetitanium bis(acetyl acetonate) | 135 | 135 | 135 |
| 1,3,5,7-tetramethyl-1,3,5,7-tetrakis-2-trimethoxysilylethylcyclotetrasiloxane | 56 | — | — |
| trimethyl-endstopped poly(methyl-2-trimethoxysilylethylsiloxane) | — | 56 | — |

-continued

| CATALYST MIXTURES | | | |
|---|---|---|---|
| COMPONENT (Parts by Weight) | E | F | G |
| 1,3,5-tris-trimethoxysilylpropylisocyanurate | — | — | 56 |

The three following room temperature vulcanizing silicone compositions were prepared by the methods of Example III and IV by mixing 3600 grams of the base compound with 200 mls. of each of the three catalyst mixtures to form three separate RTV compositions containing 100 parts by weight of the base compound and 5.55 parts by weight of catalyst mixture.

| RTV COMPOSITIONS | | | |
|---|---|---|---|
| COMPONENT (PARTS BY WEIGHT) | 6* | 7** | 8*** |
| base compound | 100 | 100 | 100 |
| catalyst mixture | | | |
| E | 5.55 | — | — |
| F | — | 5.55 | — |
| G | — | — | 5.55 |

*within the scope of this invention
**comparative corresponding linear polysiloxane adhesion promoter added
***prior art adhesion promoter added These RTV compositions were evaluated for physical properties in accordance with Examples III and IV on alclad aluminum substrates. In addition the test specimens were tested for peel adhesion after heat aging at 50° C. in an oven for various cure times. The following results were obtained:

| RTV COMPOSITIONS | | | |
|---|---|---|---|
| | 6 | 7 | 8 |
| PHYSICAL PROPERTIES | | | |
| tack free time (hrs.) | 6 | 6 | 6 |
| application rate (gms/min.) | 384 | 360 | 396 |
| Boeing flow rate (in.) | 0.20 | 0.25 | 0.28 |
| specific gravity | 1.08 | 1.09 | 1.08 |
| shore A hardness (durometer)* | 3.95 | 36 | 38 |
| tensile strength (psi)* | 665 | 713.5 | 695.5 |
| elongation (%)* | 560 | 610 | 585 |
| PEEL ADHESION RESULTS - Alclad Aluminum Substrate | | | |
| Room temperature Cure | | | |
| After 9 days | | | |
| peel strength, psi range of reported values | 28–53 | 48–76 | 43–73 |
| mean peel strength, psi | 41 | 65 | 61 |
| cohesive failure | 25% | 55% | 90% |
| After 10 days | | | |
| peel strength, psi range of reported values | 64–93 | 34–81 | 51–77 |
| mean peel strength, psi | 82 | 52 | 65 |
| cohesive failure | 40% | 25% | 50% |
| After 14 days | | | |
| Trial 1 | | | |
| peel strength, psi range of reported values | 20–72 | 51–82 | 57–83 |
| mean peel strength, psi | 40 | 64 | 66 |
| cohesive failure | 20% | 60% | 70% |
| Trial 2 | | | |
| peel strength, psi range of reported values | 28–72 | 53–79 | 54–72 |
| mean peel strength, psi | 44 | 66 | 63 |
| cohesive failure | 25% | 90% | 95% |
| After 21 days | | | |
| Trial 1 | | | |
| peel strength, psi range of reported values | 13–28 | 66–69 | 60–102 |
| mean peel strength, psi | 20 | 68 | 84 |
| cohesive failure | 10% | 80% | 80% |

-continued

| RTV COMPOSITIONS | | | |
|---|---|---|---|
| | 6 | 7 | 8 |
| Trial 2 | | | |
| peel strength, psi range of reported values | 23–60 | 53–79 | 46–79 |
| mean peel strength, psi | 43 | 66 | 63 |
| cohesive failure | 30% | 90% | 90% |
| Uncured Samples Aged At 50° C. | | | |
| *After 15 days* | | | |
| Shore A hardness (durometer) | 34 | 33 | 34 |
| tensile strength, psi | 596 | 599 | 687 |
| elongation, % | 480 | 550 | 540 |
| peel strength, psi range of reported values | 7–28 | 38–73 | 48–65 |
| mean peel strength, psi | 19 | 57 | 57 |
| cohesive failure | 5% | 50% | 80% |
| *After 30 days* | | | |
| shore A hardness (durometer) | 36 | 33 | 32 |
| tensile strength, psi | 418 | 477 | 506 |
| elongation, % | 460 | 540 | 450 |
| peel strength, psi range of reported values | 23–30 | 16–24 | 29–45 |
| mean peel strength | 27 | 19 | 34 |
| cohesive failure | 85% | 5% | 15% |
| *After 45 days* | | | |
| shore A hardness (durometer) | 33 | 31 | 32 |
| tensile strength, psi | 318 | 308 | 326 |
| elongation, % | 390 | 420 | 350 |
| peel strength, psi range of reported values | 23–27 | 18–24 | 23–26 |
| mean peel strength | 24 | 20 | 24 |
| cohesive failure | 95% | 35% | 94% |
| *After 60 days* | | | |
| shore A hardness (durometer) | 30 | 26 | 27 |
| tensile strength, psi | 266 | 237 | 284 |
| elongation, % | 300 | 440 | 420 |
| peel strength, psi range of reported values | 16–19 | 16–21 | 21–23 |
| mean peel strength | 17 | 19 | 22 |
| cohesive failure | 90% | 40% | 100% |
| *After 75 days* | | | |
| shore A hardness (durometer) | 26 | 21 | 24 |
| tensile strength, psi | 160 | 153 | 156 |
| elongation, % | 330 | 380 | 410 |
| peel adhesion, psi range of reported values | 13–16 | 17–22 | 17–20 |
| mean peel strength | 15 | 19 | 19 |
| cohesive failure | 90% | 85% | 80% |
| *After 90 days* | | | |
| shore A hardness (durometer) | 27 | 22 | 25 |
| tensile strength, psi | 117 | 81 | 113 |
| elongation, % | 260 | 310 | 350 |
| peel adhesion, psi range of reported values | 11–14 | 14–19 | 14–19 |
| mean peel strength | 12 | 16 | 17 |
| cohesive failure | 50% | 70% | 65% |
| ROOM TEMPERATURE CURE USING RTV SAMPLES AGED FOR 3 MONTHS | | | |
| *After 21 days* | | | |
| peel strength, psi range of reported values | 20–37 | 63–81 | 50–70 |
| mean peel strength, psi | 26 | 67 | 64 |
| cohesive failure | 15% | 70% | 80% |

*average after two trials.

The above results illustrate that the adhesion of the RTV compositions of this invention incorporating the cyclotetrasiloxane adhesion promoters as represented by Composition 6 to substrates of alclad aluminum may or may not be as good as RTV compositions promoted with either the corresponding linear polysiloxane adhesion promoter, Composition 7 herein, or with the 1,3,5,-tris-trimethoxysilylpropylisocyanurate adhesion promoter of Composition 8. However, these data do illustrate that the adhesion of the RTV compositions of the subject invention to alclad aluminum substrates is improved by heat aging of the sample before cure. Generally, it may be said that the adhesion promoter compounds of the subject invention improve the adhesion of RTV silicone compositions to most substrates.

EXAMPLE VI

A room temperature vulcanizing silicone composition is prepared in accordance with the procedure of Examples III and IV from the following base compound and catalyst mixture:

As used below, the M, D, T and Q are art-recognized designations for, respectfully, M = monofunctional organosiloxane unit, $R_3SiO_{\frac{1}{2}}$;
D = difunctional organosiloxane unit, $R_2SiO_{2/2}$;
T = trifunctional organosiloxane unit, $R\ SiO_{3/2}$; and
Q = tetrafunctional organosiloxane unit $SiO_{4/2}$.

BASE COMPOUND

A base compound is prepared comprising the following by weight:

| COMPONENT | PARTS BY WEIGHT |
|---|---|
| silanol-terminated polydimethylsiloxane (6,000 cps viscosity at 25° C.) | 100 |
| a M, D, T, OH silicone oil containing approximately 4 mole % trimethylsiloxy, 56 mole % dimethylsiloxy, 40 mole % methylsiloxy groups and 0.5 weight % OH | 10 |
| iron oxide, pH 6.0–7.5 | 6 |
| dimethylsiloxane-treated fumed silica having a surface area of approximately 200 sq. meters/gm. | 25 |

A catalyst mixture is prepared as follows:

CATALYST MIXTURE

| COMPONENT | PARTS BY WEIGHT |
|---|---|
| methyl-tris-2-ethylhexanoxy silane | 6 |
| dibutyltindiacetate | 0.06 |
| 1,3,5,7-tetramethyl-1,3,5,7-tetrakis-2-trimethoxysilylethyl-cyclotetrasiloxane | 0.25 |

One hundred parts of the base compound is mixed together with the catalyst mixture in a Semco catalyzer and is stored in Semco tubes for a period of three days as in Example III.

Test specimens are prepared and evaluated in accordance with Example III. The compositions exhibit improved adhesion to most of the substrates tested and in addition exhibit good resistance to hot hydrocarbon oils in oil immersion testing.

EXAMPLE VII

A room temperature vulcanizing silicone composition is prepared in accordance with the procedure of Example III from the following base compound and catalyst mixture:

|  | PARTS BY WEIGHT |
| --- | --- |
| Base Compound | |
| COMPONENTS | |
| a silanol-terminated polydimethylsiloxane, 2500 cps. viscosity at 25° C. and 0.09% by weight silicon bonded hydroxy radicals | 85 |
| methyldimethoxy-(N—methylacetamido)-silane | 3.4 |
| octamethylcyclotetrasiloxane-treated fumed silica | 15 |
| trimethoxysilylpropyltetramethyl-quanidine | 0.5 |
| Catalyst Mixture | |
| COMPONENT | |
| methyltrimethoxysilane | 2.0 parts |
| 1,3-propanedioxytitanium-bis(ethylacetoacetonate) | 1.0 part |
| 1,3,5,7-tetramethyl-1,3,5,7-tetrakis-2-trimethoxysilylethyl-cyclotetrasiloxane | 0.25 parts |

The base compound and catalyst mixture are admixed in a Semco catalyzer and stored in Semco tubes for a period of three days as in Example III.

Test specimens are prepared and evaluated in accordance with Example III. The compositions exhibit improved adhesion to most of the substrates tested and in addition after shelf storage or under simulated storage by accelerated heat aging exhibit substantially the same tack free times and other properties as test specimens prepared from the freshly mixed ingredients.

An adhesive joint is formed between two workpieces by spreading a composition prepared in accordance with Example III on a surface of the first piece and bringing the surface of the second piece into close proximity thereto, thereby forming a sandwich structure adhesive joint, with the composition therebetween. The composition is allowed to cure in the presence of atmospheric moisture at room temperature for a period of three days. A strong adhesive joint is formed which bonds the two workpieces together.

All of the patents and publications cited above are specifically incorporated herein by reference.

Although the subject invention has been described with reference to preferred embodiments, the new and improved adhesion promoters of the subject invention may be incorporated in any room temperature vulcanizable silicone composition to provide new and improved moisture curable one package RTV silicone compositions within the scope of the present invention. Modifications and changes may be made in the curable silicone compositions of this invention by those skilled skilled in the art, for example by adding plasticizers, pigments, or flame retardants, to adapt the compositions to a particular application.

In addition, if the 1,3,5,7-tetramethyl-1,3,5,7-tetrakis-2-trimethoxysilylethylcyclotetrasiloxane used as an adhesion promoter in each of Examples III-VII, inclusive, is replaced by an equal weight of the 1,3,5-trimethyl-1,3,5-tris-2-trimethoxysilylethylcyclotrisiloxane of Example II, one-part room temperature vulcanizable compositions with excellent adhesion to a wide variety of substrates will be obtained. All such modifications and changes may be made without departing from the scope and spirit of the subject invention as defined by the appended claims.

What is claimed is:

1. A diorganocyclopolysiloxane compound of the formula:

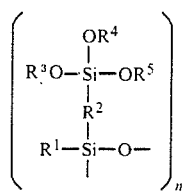

wherein $R^1$ is $C_1$-$C_6$ alkyl, $C_1$-$C_6$ gamma-trihaloalkyl or phenyl; $R^2$ is alkylene of from 2 to 6 carbon atoms; $R^3$, and $R^4$, and $R^5$ are, independently, $C_1$-$C_6$ alkyl, or $C_2$-$C_6$ alkanoyl and n is 3 or 4.

2. A diorganocyclotrisiloxane compound of the formula:

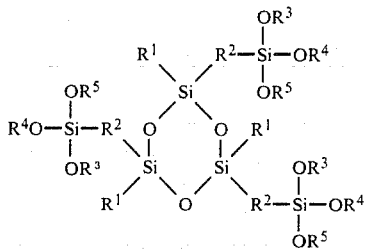

wherein $R^1$ is $C_1$-$C_6$ alkyl, $C_1$-$C_6$ gamma-trihaloalkyl or phenyl; $R^2$ is alkylene of from 2 to 6 carbon atoms; and $R^3$, $R^4$ and $R^5$ are, independently, $C_1$-$C_6$ alkyl or $C_2$-$C_6$ alkanoyl.

3. A diorganocyclotetrasiloxane compound of the formula:

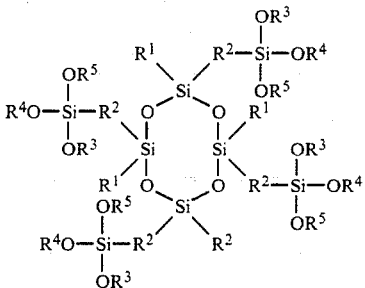

wherein $R^1$ is $C_1$-$C_6$ alkyl, $C_1$-$C_6$ gamma-trihaloalkyl or phenyl; $R^2$ is alkylene of from 2 to 6 carbon atoms; and $R^3$, $R^4$ and $R^5$ are, independently, $C_1$-$C_6$ alkyl or $C_2$-$C_6$ alkanoyl.

4. A process for the preparation of diorganocyclopolysiloxane of the formula:

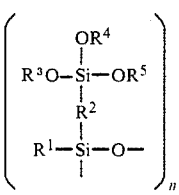

wherein $R^1$ is $C_1$-$C_6$ alkyl, $C_1$-$C_6$ gamma-trihaloalkyl or phenyl; $R^2$ is alkylene of from 2 to 6 carbon atoms; $R^3$, $R^4$ and $R^5$ are, independently, $C_1$-$C_6$ alkyl or $C_2$-$C_6$ alkanoyl and n is either 3 or 4, said process comprising:

(a) dissolving an alkylhydrogencyclopolysiloxane of the formula:

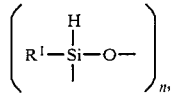

wherein $R^1$ and n are as defined above, in an aromatic organic solvent to form an approximately 20% by weight solution;

(b) heating said solution to reflux;
(c) adding a minor effective amount of a platinum silicone complex catalyst;
(d) thereafter adding a vinyl or a vinyl $C_2$-$C_4$ alkyltrialkoxy or triacyloxysilane of the formula:

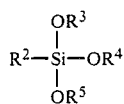

wherein $R^2$ is a vinyl or $CH_2=CH-(CH_2)_m$ group where m has a value of 1 to 4 inclusive and $R^3$, $R^4$ and $R^5$ are as defined above in an amount sufficient to provide a slight excess of the amount needed to effect a vinyl addition reaction at each Si—H bond of said alkylhydrogencyclopolysiloxane;

(e) allowing the reaction therebetween to continue until substantially complete; and
(f) finally, removing said aromatic organic solvent to leave the diorganocyclopolysiloxane product.

5. A process as recited in claim 4 wherein said alkylhydrogencyclopolysiloxane of step (a) is a 1,3,5-trisalkylhydrogencyclotrisiloxane.

6. A process as recited in claim 4 wherein the alkylhydrogencyclopolysiloxane is 1,3,5-tris-methylhydrogencyclotrisiloxane.

7. A process as recited in claim 4 wherein the alkylhydrogencyclopolysiloxane is an alkylhydrogencyclotetrasiloxane.

8. A process as recited in claim 4 wherein the alkylhydrogencyclopolysiloxane is 1,3,5,7-tetramethyl-1,3,5,7-tetrakis-methylhydrogencyclotetrasiloxane.

9. An article of manufacture comprising a plurality of pieces, each piece having at least a part of a surface portion in close proximity to another piece, and having an adhesive joint therebetween, said adhesive joint comprising a low modulus, rubbery, moisture cured composition comprising:

(a) a silanol or polyalkoxy chain-stopped diorganopolysiloxane;
(b) a silane or polysilane crosslinker therefor;
(c) a catalyst capable of promoting the reactions between (a) and (b); and
(d) a small, effective, adhesion promoting amount of a composition comprising at least one compound of the formula:

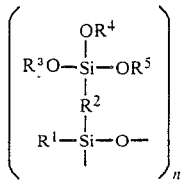

wherein $R^1$ is $C_1$-$C_6$ alkyl, $C_1$-$C_6$ gamma-trihaloalkyl or phenyl; $R^2$ is alkylene of from 2 to 6 carbon atoms; $R^3$, $R^4$ and $R^5$ are, independently, $C_1$-$C_6$ alkyl or $C_2$-$C_6$ alkanoyl and n is 3 or 4.

10. A method of bonding a plurality of articles comprising:

(a) providing a plurality of articles;
(b) applying a layer of moisture-curable, adhesive joint forming composition to at least a portion of a surface of at least one of the articles;
(c) bringing at least two surfaces of at least two of said articles into proximity so as to complete formation of a moisture curable adhesive joint therebetween; and
(d) exposing the article of step (c) to moisture until the adhesive joint forming composition has cured to a firmly adhered rubbery material, said moisture curable adhesive joint forming composition comprising:
(i) a silanol or polyalkoxy chain-stopped polydiorganosiloxane;
(ii) a silane or polysilane crosslinker therefor;
(iii) a catalyst capable of promoting the reactions between (i) and (ii); and
(iv) a small, effective, adhesion promoting amount of a composition comprising at least one diorganocyclopolysiloxane compound of the formula:

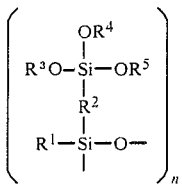

wherein $R^1$ is $C_1$-$C_6$ alkyl, $C_1$-$C_6$ gamma trihaloalkyl or phenyl; $R^2$ is alkylene of from 2 to 6 carbon atoms; $R^3$, $R^4$ and $R^5$ are, independently $C_1$-$C_6$ alkyl or $C_2$-$C_6$ alkanoyl and n is 3 or 4.

11. The process as recited in claim 4 wherein said diorganocyclopolysiloxane product is 1,3,5-trimethyl-1,3,5-tris-2-trimethoxysilylethylcyclotrisiloxane.

12. A process a recited in claim 4 wherein the diorganocyclopolysiloxane product is 1,3,5,7-tetramethyl-1,3,5,7-tetrakis-2-trimethoxysilyethylcyclotetrasiloxane.

* * * * *